United States Patent
Van Os et al.

(10) Patent No.: US 11,922,518 B2
(45) Date of Patent: Mar. 5, 2024

(54) MANAGING CONTACT INFORMATION FOR COMMUNICATION APPLICATIONS

(71) Applicant: Apple Inc., Cupertino, CA (US)

(72) Inventors: Marcel Van Os, Santa Cruz, CA (US); Sebastian Bauer, Santa Monica, CA (US); Tiffany S. Jon, Cupertino, CA (US); Nicole R. Ryan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/108,314

(22) Filed: Feb. 10, 2023

(65) Prior Publication Data

US 2023/0316426 A1 Oct. 5, 2023

Related U.S. Application Data

(63) Continuation of application No. 15/291,829, filed on Oct. 12, 2016, now Pat. No. 11,580,608.
(Continued)

(51) Int. Cl.
*G06F 3/0489* (2022.01)
*G06F 3/04883* (2022.01)
(Continued)

(52) U.S. Cl.
CPC .......... *G06Q 50/01* (2013.01); *G06F 3/04883* (2013.01); *G06F 3/0489* (2013.01); *G06Q 10/107* (2013.01); *H04M 7/0024* (2013.01)

(58) Field of Classification Search
CPC ............. G06F 3/04883; G06F 3/04817; G06F 3/0482; G06F 3/04842; G06F 3/0488;
(Continued)

(56) References Cited

U.S. PATENT DOCUMENTS

| 5,559,947 A | 9/1996 | Wugofski |
| 5,917,913 A | 6/1999 | Wang |

(Continued)

FOREIGN PATENT DOCUMENTS

| CA | 2541620 A1 | 10/2007 |
| CN | 1581901 A | 2/2005 |

(Continued)

OTHER PUBLICATIONS

Non-Final Office Action received for U.S. Appl. No. 17/517,537, dated Aug. 10, 2023, 14 pages.
(Continued)

*Primary Examiner* — Nicholas Klicos
(74) *Attorney, Agent, or Firm* — DLA Piper LLP (US)

(57) ABSTRACT

The present disclosure generally relates to contact management and communication with contacts. On a portable electronic device having a display a plurality of affordances associated with a plurality of contacts are displayed. A first user input is received selecting a first affordance of the plurality of affordances for a first contact of the plurality of contacts. In response to receiving the first user input and in accordance with a determination that a first communication application is in a set of communication applications installed on the portable electronic device, a contact information interface is displayed for the first contact. The contact information interface includes a first contact identification field for the first contact. The first contact identification field is associated with the first contact and the first communication application.

21 Claims, 16 Drawing Sheets

Related U.S. Application Data

(60) Provisional application No. 62/348,981, filed on Jun. 12, 2016.

(51) Int. Cl.
*G06Q 10/107* (2023.01)
*G06Q 50/00* (2012.01)
*H04M 7/00* (2006.01)

(58) Field of Classification Search
CPC . H04M 1/724; H04M 1/72403; G06Q 10/107
See application file for complete search history.

(56) References Cited

U.S. PATENT DOCUMENTS

| | | | |
|---|---|---|---|
| 5,995,119 A | 11/1999 | Cosatto et al. |
| 6,282,656 B1 | 8/2001 | Wang |
| 6,545,682 B1 | 4/2003 | Ventrella et al. |
| 6,919,892 B1 | 7/2005 | Cheiky et al. |
| 7,027,054 B1 | 4/2006 | Cheiky et al. |
| 7,155,411 B1 | 12/2006 | Blinn et al. |
| 8,130,219 B2 | 3/2012 | Fleury et al. |
| 8,200,962 B1 | 6/2012 | Perry et al. |
| 8,539,050 B2 | 9/2013 | Tow et al. |
| 8,601,379 B2 | 12/2013 | Marks et al. |
| 8,848,879 B1 | 9/2014 | Coughlan et al. |
| 8,863,112 B2 | 10/2014 | Kumagai |
| 8,867,849 B1 | 10/2014 | Kirkham et al. |
| 8,924,292 B1 | 12/2014 | Ellis et al. |
| 8,935,755 B1 | 1/2015 | Kay |
| 9,298,257 B2 | 3/2016 | Hwang et al. |
| 9,497,606 B1 | 11/2016 | Brewer |
| 9,576,400 B2 | 2/2017 | Van Os et al. |
| 9,785,827 B1 | 10/2017 | Ray |
| 9,817,484 B2 | 11/2017 | Geng et al. |
| 10,002,539 B2 | 6/2018 | Miller et al. |
| 10,122,958 B2 | 11/2018 | Kim et al. |
| 10,155,168 B2 | 12/2018 | Blackstock et al. |
| 10,169,897 B1 | 1/2019 | Geiger et al. |
| 10,171,985 B1 | 1/2019 | Czajka et al. |
| 10,237,276 B2 | 3/2019 | Gupta |
| 10,262,327 B1 | 4/2019 | Hardebeck et al. |
| 10,397,391 B1 | 8/2019 | Czajka et al. |
| 10,607,065 B2 | 3/2020 | Milman et al. |
| 10,607,419 B2 | 3/2020 | Os et al. |
| 10,659,405 B1 | 5/2020 | Chang et al. |
| 11,055,889 B2 | 7/2021 | Lee et al. |
| 2001/0019330 A1 | 9/2001 | Bickmore et al. |
| 2001/0039552 A1 | 11/2001 | Killi et al. |
| 2001/0050689 A1 | 12/2001 | Park |
| 2002/0023215 A1 | 2/2002 | Wang et al. |
| 2002/0072993 A1 | 6/2002 | Sandus et al. |
| 2002/0180622 A1 | 12/2002 | Lui et al. |
| 2003/0046421 A1 | 3/2003 | Horvitz et al. |
| 2003/0061157 A1 | 3/2003 | Hirka et al. |
| 2003/0154446 A1 | 8/2003 | Constant et al. |
| 2004/0049539 A1 | 3/2004 | Reynolds et al. |
| 2005/0027716 A1 | 2/2005 | Apfel |
| 2005/0137015 A1 | 6/2005 | Rogers et al. |
| 2005/0193343 A1 | 9/2005 | Kawabe et al. |
| 2005/0198171 A1 | 9/2005 | Landsman et al. |
| 2005/0202748 A1 | 9/2005 | Porter |
| 2005/0231513 A1 | 10/2005 | Lebarton et al. |
| 2006/0000900 A1 | 1/2006 | Fernandes et al. |
| 2006/0047747 A1 | 3/2006 | Erickson et al. |
| 2006/0064372 A1 | 3/2006 | Gupta |
| 2006/0135142 A1 | 6/2006 | Repka |
| 2006/0143569 A1 | 6/2006 | Kinsella et al. |
| 2007/0004385 A1 | 1/2007 | Horvitz et al. |
| 2007/0116195 A1 | 5/2007 | Thompson et al. |
| 2007/0130327 A1 | 6/2007 | Kuo et al. |
| 2007/0168357 A1 | 7/2007 | Mo |
| 2007/0254712 A1 | 11/2007 | Chitti |
| 2008/0078831 A1 | 4/2008 | Johnson et al. |
| 2008/0119286 A1 | 5/2008 | Brunstetter et al. |
| 2008/0122796 A1 | 5/2008 | Jobs et al. |
| 2008/0133580 A1 | 6/2008 | Wanless et al. |
| 2008/0242423 A1 | 10/2008 | Kerr et al. |
| 2008/0281633 A1 | 11/2008 | Burdea et al. |
| 2008/0300572 A1 | 12/2008 | Rankers et al. |
| 2009/0030793 A1 | 1/2009 | Fordyce, III |
| 2009/0044113 A1 | 2/2009 | Jones et al. |
| 2009/0055484 A1 | 2/2009 | Vuong et al. |
| 2009/0144203 A1 | 6/2009 | Hurry |
| 2009/0170480 A1 | 7/2009 | Lee |
| 2009/0182674 A1 | 7/2009 | Patel et al. |
| 2009/0195469 A1 | 8/2009 | Lim et al. |
| 2009/0222842 A1 | 9/2009 | Narayanan et al. |
| 2009/0254859 A1 | 10/2009 | Arrasvuori et al. |
| 2009/0271486 A1 | 10/2009 | Ligh et al. |
| 2009/0298489 A1 | 12/2009 | Chitturi et al. |
| 2009/0299232 A1 | 12/2009 | Lanfermann et al. |
| 2009/0300513 A1 | 12/2009 | Nims et al. |
| 2009/0307629 A1 | 12/2009 | Horiuchi et al. |
| 2009/0319288 A1 | 12/2009 | Slaney et al. |
| 2010/0007665 A1 | 1/2010 | Smith et al. |
| 2010/0042517 A1 | 2/2010 | Paintin et al. |
| 2010/0058333 A1 | 3/2010 | Peterson |
| 2010/0082445 A1 | 4/2010 | Hodge et al. |
| 2010/0097375 A1 | 4/2010 | Tadaishi et al. |
| 2010/0161434 A1 | 6/2010 | Herwig et al. |
| 2010/0167809 A1 | 7/2010 | Perlman et al. |
| 2010/0169376 A1 | 7/2010 | Chu |
| 2010/0185677 A1 | 7/2010 | Gupta et al. |
| 2010/0199200 A1 | 8/2010 | Fujioka |
| 2010/0203968 A1 | 8/2010 | Gill et al. |
| 2010/0211900 A1 | 8/2010 | Fujioka |
| 2010/0211917 A1 | 8/2010 | Tsuei |
| 2010/0306185 A1 | 12/2010 | Smith et al. |
| 2011/0025707 A1 | 2/2011 | Fujioka |
| 2011/0064388 A1 | 3/2011 | Brown et al. |
| 2011/0119596 A1 | 5/2011 | Nesladek et al. |
| 2011/0131521 A1 | 6/2011 | Cho et al. |
| 2011/0184820 A1 | 7/2011 | Mon et al. |
| 2011/0197163 A1 | 8/2011 | Jegal et al. |
| 2011/0202417 A1 | 8/2011 | Dewakar et al. |
| 2011/0218849 A1 | 9/2011 | Rutigliano et al. |
| 2011/0244796 A1 | 10/2011 | Khan et al. |
| 2011/0248992 A1 | 10/2011 | Van et al. |
| 2011/0251892 A1 | 10/2011 | Laracey |
| 2011/0252344 A1 | 10/2011 | Van |
| 2011/0252381 A1 | 10/2011 | Chaudhri |
| 2011/0262103 A1 | 10/2011 | Ramachandran et al. |
| 2011/0296324 A1 | 12/2011 | Goossens et al. |
| 2011/0298808 A1 | 12/2011 | Rovik |
| 2011/0304629 A1 | 12/2011 | Winchester |
| 2012/0011453 A1 | 1/2012 | Shimono et al. |
| 2012/0075328 A1 | 3/2012 | Goossens |
| 2012/0101881 A1 | 4/2012 | Taylor et al. |
| 2012/0101887 A1 | 4/2012 | Harvey et al. |
| 2012/0109764 A1 | 5/2012 | Martin et al. |
| 2012/0110507 A1 | 5/2012 | Washington et al. |
| 2012/0117456 A1 | 5/2012 | Koskimies |
| 2012/0123868 A1 | 5/2012 | Brudnicki et al. |
| 2012/0131089 A1 | 5/2012 | Berkowitz et al. |
| 2012/0135718 A1 | 5/2012 | Amidon et al. |
| 2012/0149408 A1 | 6/2012 | Steer et al. |
| 2012/0191603 A1 | 7/2012 | Nuzzi |
| 2012/0215647 A1 | 8/2012 | Powell et al. |
| 2012/0223952 A1 | 9/2012 | Kanemaru et al. |
| 2012/0232968 A1 | 9/2012 | Calman et al. |
| 2012/0233120 A1 | 9/2012 | Nijim et al. |
| 2012/0260189 A1 | 10/2012 | Howard et al. |
| 2012/0262484 A1 | 10/2012 | Gottfeld et al. |
| 2012/0293619 A1 | 11/2012 | Newton et al. |
| 2012/0309520 A1 | 12/2012 | Evertt et al. |
| 2012/0310760 A1 | 12/2012 | Phillips et al. |
| 2012/0317023 A1 | 12/2012 | Moon et al. |
| 2012/0324359 A1 | 12/2012 | Lee et al. |
| 2013/0006746 A1 | 1/2013 | Moore et al. |
| 2013/0013954 A1 | 1/2013 | Benedek et al. |
| 2013/0067453 A1 | 3/2013 | Luan |
| 2013/0090098 A1 | 4/2013 | Gidwani |
| 2013/0102290 A1 | 4/2013 | Akhtar et al. |

(56) References Cited

U.S. PATENT DOCUMENTS

| | | |
|---|---|---|
| 2013/0124319 A1 | 5/2013 | Hodge et al. |
| 2013/0143521 A1 | 6/2013 | Hernandez et al. |
| 2013/0149989 A1 | 6/2013 | Kwon et al. |
| 2013/0179304 A1 | 7/2013 | Swist et al. |
| 2013/0185214 A1 | 7/2013 | Azen et al. |
| 2013/0235045 A1 | 9/2013 | Corazza et al. |
| 2013/0238455 A1 | 9/2013 | Laracey |
| 2013/0258040 A1 | 10/2013 | Kaytaz et al. |
| 2013/0282533 A1 | 10/2013 | Foran-Owens et al. |
| 2013/0282813 A1 | 10/2013 | Lessin et al. |
| 2013/0290187 A1 | 10/2013 | Itwaru |
| 2013/0316316 A1 | 11/2013 | Flavell et al. |
| 2013/0318347 A1 | 11/2013 | Moffat |
| 2013/0318476 A1 | 11/2013 | Sauve et al. |
| 2013/0326367 A1 | 12/2013 | Nakamura et al. |
| 2014/0040066 A1 | 2/2014 | Fujioka |
| 2014/0064465 A1 | 3/2014 | Banta et al. |
| 2014/0073298 A1 | 3/2014 | Rossmann |
| 2014/0074569 A1 | 3/2014 | Francis et al. |
| 2014/0078144 A1 | 3/2014 | Berriman et al. |
| 2014/0108263 A1 | 4/2014 | Ortiz et al. |
| 2014/0115451 A1 | 4/2014 | Sheldon-Dante |
| 2014/0129435 A1 | 5/2014 | Pardo et al. |
| 2014/0130035 A1 | 5/2014 | Desai et al. |
| 2014/0149198 A1 | 5/2014 | Kim et al. |
| 2014/0169225 A1 | 6/2014 | Citron et al. |
| 2014/0172533 A1 | 6/2014 | Andrews et al. |
| 2014/0173466 A1 | 6/2014 | Suri et al. |
| 2014/0173529 A1 | 6/2014 | Hicks |
| 2014/0179428 A1 | 6/2014 | Miura et al. |
| 2014/0198121 A1 | 7/2014 | Tong et al. |
| 2014/0205259 A1 | 7/2014 | Kamity et al. |
| 2014/0220855 A1 | 8/2014 | Heilbron et al. |
| 2014/0244493 A1 | 8/2014 | Kenyon et al. |
| 2014/0244495 A1 | 8/2014 | Davis et al. |
| 2014/0253522 A1 | 9/2014 | Cueto |
| 2014/0254434 A1 | 9/2014 | Jain et al. |
| 2014/0267311 A1 | 9/2014 | Evertt et al. |
| 2014/0279062 A1 | 9/2014 | Hackman et al. |
| 2014/0279474 A1 | 9/2014 | Evans et al. |
| 2014/0297385 A1 | 10/2014 | Ryan |
| 2014/0310606 A1 | 10/2014 | Liu et al. |
| 2014/0317520 A1 | 10/2014 | Sherrard et al. |
| 2014/0328479 A1* | 11/2014 | Epiktetov ............ G06F 3/0482 379/265.09 |
| 2014/0343703 A1 | 11/2014 | Topchy et al. |
| 2014/0359766 A1 | 12/2014 | Klein et al. |
| 2014/0365895 A1* | 12/2014 | Magahern ........... G06F 3/04842 715/762 |
| 2014/0375817 A1 | 12/2014 | Meschter et al. |
| 2015/0012425 A1 | 1/2015 | Mathew |
| 2015/0052064 A1 | 2/2015 | Karpenko et al. |
| 2015/0062318 A1 | 3/2015 | Wexler |
| 2015/0087414 A1 | 3/2015 | Chen et al. |
| 2015/0112781 A1 | 4/2015 | Clark et al. |
| 2015/0128021 A1 | 5/2015 | Hewett et al. |
| 2015/0134603 A1 | 5/2015 | Melamed et al. |
| 2015/0135108 A1 | 5/2015 | Pope et al. |
| 2015/0135278 A1 | 5/2015 | Corda et al. |
| 2015/0150128 A1 | 5/2015 | Li |
| 2015/0186871 A1 | 7/2015 | Laracey |
| 2015/0199494 A1 | 7/2015 | Koduri et al. |
| 2015/0205842 A1 | 7/2015 | Jain et al. |
| 2015/0251093 A1 | 9/2015 | Trombetta et al. |
| 2015/0254886 A1 | 9/2015 | Li |
| 2015/0325029 A1 | 11/2015 | Li et al. |
| 2015/0326655 A1 | 11/2015 | Quan et al. |
| 2015/0347618 A1 | 12/2015 | Ogita |
| 2015/0373173 A1 | 12/2015 | Taher |
| 2015/0381896 A1 | 12/2015 | Park et al. |
| 2016/0005206 A1 | 1/2016 | Li et al. |
| 2016/0006987 A1 | 1/2016 | Li et al. |
| 2016/0037331 A1 | 2/2016 | Vernon et al. |
| 2016/0042548 A1 | 2/2016 | Du et al. |
| 2016/0050169 A1 | 2/2016 | Ben Atar et al. |
| 2016/0055246 A1 | 2/2016 | Marcin et al. |
| 2016/0055370 A1 | 2/2016 | Garcia |
| 2016/0057087 A1 | 2/2016 | Gomba |
| 2016/0086387 A1 | 3/2016 | Os et al. |
| 2016/0134635 A1 | 5/2016 | Thelin et al. |
| 2016/0182661 A1 | 6/2016 | Brezina et al. |
| 2016/0191667 A1 | 6/2016 | Desai et al. |
| 2016/0191694 A1 | 6/2016 | Kim et al. |
| 2016/0210013 A1 | 7/2016 | Park et al. |
| 2016/0231878 A1 | 8/2016 | Tsuda et al. |
| 2016/0277386 A1 | 9/2016 | Waters et al. |
| 2016/0292901 A1 | 10/2016 | Li et al. |
| 2016/0300379 A1 | 10/2016 | Du et al. |
| 2016/0307028 A1 | 10/2016 | Fedorov |
| 2016/0328886 A1 | 11/2016 | Tong et al. |
| 2016/0357583 A1 | 12/2016 | Adler et al. |
| 2016/0358167 A1 | 12/2016 | Van Os et al. |
| 2016/0358168 A1 | 12/2016 | Van Os et al. |
| 2016/0358199 A1 | 12/2016 | Van Os et al. |
| 2016/0360256 A1 | 12/2016 | Albert et al. |
| 2016/0378304 A1 | 12/2016 | Bahgat et al. |
| 2017/0046065 A1 | 2/2017 | Zeng et al. |
| 2017/0046426 A1 | 2/2017 | Pearce et al. |
| 2017/0046979 A1 | 2/2017 | Lehary |
| 2017/0100637 A1 | 4/2017 | Princen et al. |
| 2017/0113140 A1 | 4/2017 | Blackstock et al. |
| 2017/0139879 A1 | 5/2017 | Sharifi et al. |
| 2017/0256086 A1 | 9/2017 | Park et al. |
| 2017/0286423 A1 | 10/2017 | Shorman et al. |
| 2017/0289073 A1 | 10/2017 | Crusson et al. |
| 2017/0323266 A1 | 11/2017 | Seo |
| 2017/0346772 A1 | 11/2017 | Albouyeh et al. |
| 2017/0358117 A1 | 12/2017 | Goossens et al. |
| 2017/0359302 A1 | 12/2017 | Van Os et al. |
| 2017/0359462 A1 | 12/2017 | Harris et al. |
| 2018/0025219 A1 | 1/2018 | Baldwin et al. |
| 2018/0047200 A1 | 2/2018 | O'hara et al. |
| 2018/0056125 A1 | 3/2018 | Tagu et al. |
| 2018/0081515 A1 | 3/2018 | Block et al. |
| 2018/0091732 A1 | 3/2018 | Wilson et al. |
| 2018/0130094 A1 | 5/2018 | Tung et al. |
| 2018/0157901 A1 | 6/2018 | Arbatman et al. |
| 2018/0197343 A1 | 7/2018 | Hare et al. |
| 2018/0316775 A1 | 11/2018 | Kwon et al. |
| 2018/0335930 A1 | 11/2018 | Scapel et al. |
| 2019/0087082 A1 | 3/2019 | Chaudhri et al. |
| 2019/0171338 A1 | 6/2019 | Voss et al. |
| 2019/0171869 A1 | 6/2019 | Fortune et al. |
| 2019/0230400 A1 | 7/2019 | Van Os et al. |
| 2019/0266775 A1 | 8/2019 | Lee et al. |
| 2019/0266807 A1 | 8/2019 | Lee et al. |
| 2019/0279410 A1 | 9/2019 | Orvalho et al. |
| 2019/0295056 A1 | 9/2019 | Wright |
| 2019/0370492 A1 | 12/2019 | Falchuk et al. |
| 2020/0211047 A1 | 7/2020 | Van Os et al. |
| 2020/0306640 A1 | 10/2020 | Kolen et al. |
| 2020/0358725 A1 | 11/2020 | Scapel et al. |
| 2020/0358726 A1 | 11/2020 | Dryer et al. |
| 2021/0027514 A1 | 1/2021 | Kwon et al. |
| 2022/0060775 A1 | 2/2022 | Van Os et al. |
| 2022/0122309 A1 | 4/2022 | Kim et al. |
| 2022/0148027 A1 | 5/2022 | Van Os et al. |
| 2023/0334522 A1 | 10/2023 | Van Os et al. |

FOREIGN PATENT DOCUMENTS

| | | |
|---|---|---|
| CN | 103945275 A | 7/2014 |
| CN | 104159177 A | 11/2014 |
| CN | 104461894 A | 3/2015 |
| CN | 104836879 A | 8/2015 |
| CN | 106101358 A | 11/2016 |
| CN | 107171934 A | 9/2017 |
| CN | 107613085 A | 1/2018 |
| EP | 2028611 A1 | 2/2009 |
| EP | 2701107 A1 | 2/2014 |
| EP | 2784672 A1 | 10/2014 |
| EP | 3308563 A1 | 4/2018 |
| EP | 3396618 A1 | 10/2018 |
| JP | 2006-221468 A | 8/2006 |

(56) References Cited

FOREIGN PATENT DOCUMENTS

| | | | |
|---|---|---|---|
| JP | 2007-329632 A | 12/2007 | |
| JP | 2009-134521 A | 6/2009 | |
| JP | 2010-224837 A | 10/2010 | |
| JP | 2011-40865 A | 2/2011 | |
| JP | 2011-199523 A | 10/2011 | |
| JP | 2012-18569 A | 1/2012 | |
| JP | 2012-508930 A | 4/2012 | |
| JP | 2012-114676 A | 6/2012 | |
| JP | 2012-198625 A | 10/2012 | |
| JP | 2013-218663 A | 10/2013 | |
| JP | 2014-41616 A | 3/2014 | |
| JP | 2014-528601 A | 10/2014 | |
| JP | 2015-506040 A | 2/2015 | |
| KR | 10-2006-0098024 A | 9/2006 | |
| KR | 10-2010-0045059 A | 5/2010 | |
| KR | 10-1184865 B1 | 9/2012 | |
| KR | 10-2013-0112339 A | 10/2013 | |
| KR | 10-2014-0018019 A | 2/2014 | |
| KR | 10-2014-0027029 A | 3/2014 | |
| KR | 10-1866407 B1 | 6/2018 | |
| KR | 10-2019-0033082 A | 3/2019 | |
| WO | 2012/043725 A1 | 4/2012 | |
| WO | 2013/090624 A1 | 6/2013 | |
| WO | 2015/009581 A1 | 1/2015 | |
| WO | 2015/009765 A1 | 1/2015 | |
| WO | 2015/013522 A1 | 1/2015 | |
| WO | 2015/027912 A1 | 3/2015 | |
| WO | 2015/030912 A1 | 3/2015 | |
| WO | 2015/033333 A1 | 3/2015 | |
| WO | 2015/051361 A1 | 4/2015 | |
| WO | 2015/065561 A1 | 5/2015 | |
| WO | 2018/057272 A1 | 3/2018 | |
| WO | 2018/151758 A1 | 8/2018 | |

OTHER PUBLICATIONS

Notice of Acceptance received for Australian Patent Application No. 2023200867, dated Sep. 13, 2023, 3 pages.
Notice of Allowance received for Korean Patent Application No. 10-2021-7036424, dated Sep. 11, 2023, 7 pages (2 pages of English Translation and 5 pages of Official Copy).
Advisory Action received for U.S. Appl. No. 14/869,715, dated Feb. 8, 2017, 3 pages.
Advisory Action received for U.S. Appl. No. 14/869,715, dated May 18, 2017, 6 pages.
Advisory Action received for U.S. Appl. No. 16/367,702, dated Aug. 18, 2021, 6 pages.
Advisory Action received for U.S. Appl. No. 16/583,706, dated Mar. 21, 2022, 3 pages.
AKG Technical, "Mojipop app//Mozipop gif maker app//How to use mojipop app; AKG Technical", Available online at: https://www.youtube.com/watch?v=_9pdQ3CpWA4, Feb. 4, 2019, 4 pages.
Applicant-Initiated Interview Summary received for U.S. Appl. No. 15/291,829, dated Aug. 17, 2020, 5 pages.
Applicant-Initiated Interview Summary received for U.S. Appl. No. 15/291,829, dated Feb. 4, 2020, 5 pages.
Applicant-Initiated Interview Summary received for U.S. Appl. No. 15/291,829, dated Jun. 13, 2022, 5 pages.
Applicant-Initiated Interview Summary received for U.S. Appl. No. 15/291,829, dated Mar. 22, 2021, 5 pages.
Applicant-Initiated Interview Summary received for U.S. Appl. No. 15/291,829, dated Oct. 7, 2021, 5 pages.
Applicant-Initiated Interview Summary received for U.S. Appl. No. 16/367,702, dated Jul. 28, 2020, 3 pages.
Applicant-Initiated Interview Summary received for U.S. Appl. No. 16/367,702, dated May 17, 2021, 2 pages.
Applicant-Initiated Interview Summary received for U.S. Appl. No. 16/367,702, dated Nov. 30, 2020, 3 pages.
Applicant-Initiated Interview Summary received for U.S. Appl. No. 16/582,500, dated Aug. 25, 2020, 5 pages.
Applicant-Initiated Interview Summary received for U.S. Appl. No. 16/582,500, dated Dec. 27, 2021, 8 pages.
Applicant-Initiated Interview Summary received for U.S. Appl. No. 16/582,500, dated Feb. 1, 2021, 6 pages.
Applicant-Initiated Interview Summary received for U.S. Appl. No. 16/582,500, dated Jul. 1, 2022, 6 pages.
Applicant-Initiated Interview Summary received for U.S. Appl. No. 16/583,706, dated Aug. 9, 2021, 5 pages.
Applicant-Initiated Interview Summary received for U.S. Appl. No. 16/583,706, dated Feb. 27, 2020, 6 pages.
Applicant-Initiated Interview Summary received for U.S. Appl. No. 16/583,706, dated Nov. 18, 2020, 7 pages.
AT&T Customer Care, "How to Access & Manage Contacts on Your Samsung Galaxy S9 S9+ | AT&T Wireless", Online Available at: https://www.youtube.com/watch?v=nb4Zf9Xi5ZQ, Mar. 9, 2018, 8 pages.
AZ Screen Recorder—No Root Needed—Including Lollipop Roms, Available online at; https://www.youtube.com/watch?v=EMvo0Fr-w5w, Feb. 27, 2015, 7 pages.
AZ Screen Recorder,"AZ Screen Recorder", Online Available at <https://www.youtube.com/watch?v=llc9nKoL9JY>, Published on Jan. 15, 2015, 3 pages.
AZ Screen Recorder, "Full features—AZ Screen Recorder", Online Available at <https://www.youtube.com/watch?v=L6tAMO_Bu34>, Published on Feb. 13, 2015, 3 pages.
AZ Screen Recorder,"GIF converter—AZ Screen Recorder", Online Available at <https://www.youtube.com/watch?v=gA19pr1QOFM>, May 29, 2015, 2 pages.
Banaś Iwo, "SCR Free Sample", Available online at; https://www.youtube.com/watch?v=ZILDulGdcQM, Jun. 13, 2013, 1 page.
Bomen XYZ, "Cara membuat stiker di android, WhatsApp, Fb Messenger dil || Work 100%", Available online at: https://www.youtube.com/watch?v=cafBfzD1Bbo, Feb. 21, 2019, 3 pages.
Brief Communication Regarding Oral Proceedings received for European Patent Application No. 20180033.1, dated Feb. 25, 2022, 20 pages.
Canchichi, "Mii Creation", Online available at: https://www.youtube.com/watch?v=bYm7IEYu42k, Jan. 16, 2007, 4 pages.
Corrected Notice of Allowance received for U.S. Appl. No. 16/582,570, dated Mar. 31, 2020, 2 pages.
Corrected Notice of Allowance received for U.S. Appl. No. 16/814,226, dated Apr. 8, 2022, 2 pages.
Corrected Notice of Allowance received for U.S. Appl. No. 16/814,226, dated Mar. 9, 2022, 2 pages.
Decision to Refuse Application received for the European Patent Application No. 16803996.4, dated Apr. 3, 2020, 25 pages.
Decision to Refuse received for European Patent Application No. 18154163.2, dated May 17, 2019, 22 pages.
Decision to Refuse received for European Patent Application No. 20180033.1, dated Mar. 28, 2022, 30 pages.
Decision to Refuse received for the European Patent Application No. 16803996.4, dated Apr. 14, 2020, 28 pages.
European Search Report received for European Patent Application No. 20180033.1, dated Jul. 6, 2020, 4 pages.
Extended European Search Report received for European Patent Application No. 16803996.4, dated Feb. 7, 2018, 8 pages.
Extended European Search Report received for European Patent Application No. 16808015.8, dated May 2, 2018, 13 pages.
Extended European Search Report received for European Patent Application No. 18154163.2, dated Mar. 2, 2018, 4 pages.
Final Office Action received for U.S. Appl. No. 14/863,616, dated Apr. 24, 2017, 18 pages.
Final Office Action received for U.S. Appl. No. 14/863,616, dated Aug. 10, 2018, 16 pages.
Final Office Action received for U.S. Appl. No. 14/869,715, dated Jun. 17, 2016, 35 pages.
Final Office Action received for U.S. Appl. No. 14/869,715, dated Mar. 7, 2017, 41 pages.
Final Office Action received for U.S. Appl. No. 14/869,715, dated Oct. 6, 2016, 37 pages.
Final Office Action Received for U.S. Appl. No. 14/871,635, dated Jan. 18, 2018, 33 pages.

(56) References Cited

OTHER PUBLICATIONS

Final Office Action Received for U.S. Appl. No. 14/871,635, dated May 3, 2019, 32 pages.
Final Office Action Received for U.S. Appl. No. 14/871,654, dated Nov. 16, 2017, 32 pages.
Final Office Action received for U.S. Appl. No. 15/291,829, dated Jun. 14, 2019, 24 pages.
Final Office Action received for U.S. Appl. No. 15/291,829, dated Mar. 10, 2022, 29 pages.
Final Office Action received for U.S. Appl. No. 15/291,829, dated May 13, 2020, 25 pages.
Final Office Action received for U.S. Appl. No. 16/367,702, dated Jun. 3, 2021, 17 pages.
Final Office Action received for U.S. Appl. No. 16/367,702, dated Sep. 18, 2020, 18 pages.
Final Office Action received for U.S. Appl. No. 16/582,500, dated Apr. 29, 2022, 23 pages.
Final Office Action received for U.S. Appl. No. 16/582,500, dated Nov. 30, 2020, 20 pages.
Final Office Action received for U.S. Appl. No. 16/583,706, dated Jun. 11, 2020, 31 pages.
Flyme Global,"Flyme 6—Setup Contact Avatar", Available online at: https://www.youtube.com/watch?v=HvmyZdovhEk, May 15, 2017, 3 pages.
Gardener Ricardo, "How to Create and Use AR Emoji Galaxy S10, S10 Plus", Available online at: https://www.youtube.com/watch?v=wNjgUQzFYto, May 9, 2019, 3 pages.
Gavin Brady, "How to Remove Old User Account Pictures in Windows 10", Available online at: https://www.howtogeek.com/369601/how-to-remove-old-user-account-pictures-in-windows-10/, Oct. 16, 2018, 5 pages.
Google, "Android 2.2 User's Guide", May 20, 2010, pp. 1-2, 25-28, 52-53, 70-73. Preliminary Report on Patentability received for PCT Application No. PCT/US2015/065503, dated Dec. 21, 2017, 7 pages.
International Preliminary Report on Patentability received for PCT Application No. PCT/US2015/065503, dated Dec. 21, 2017, 7 pages.
International Preliminary Report on Patentability received for PCT Patent Application No. PCT/US2016/033751, dated Dec. 14, 2017, 11 pages.
International Preliminary Report on Patentability received for PCT Patent Application No. PCT/US2016/033946, dated Dec. 21, 2017, 11 pages.
International Search Report and Written Opinion received for PCT Patent Application No. PCT/US2015/065503, dated Mar. 2, 2016, 12 pages.
International Search Report and Written Opinion received for PCT Patent Application No. PCT/US2016/033751, dated Oct. 5, 2016, 14 pages.
International Search Report and Written Opinion received for PCT Patent Application No. PCT/US2016/033946, dated Oct. 18, 2016, 14 pages.
International Search Report and Written Opinion received for PCT Patent Application No. PCT/US2020/025913, dated Sep. 15, 2020, 19 pages.
Invitation to Pay Additional Fee received for PCT Patent Application No. PCT/US2016/033946, mailed on Aug. 2, 2016, 2 pages.
Invitation to Pay Additional Fees received for PCT Patent Application No. PCT/US2016/033751, mailed on Jul. 22, 2016, 2 pages.
Invitation to Pay Additional Fees received for PCT Patent Application No. PCT/US2020/025913, mailed on Jul. 24, 2020, 11 pages.
Invitation to Pay Search Fees received for European Patent Application No. 20722020.3, mailed on Feb. 16, 2021, 3 pages.
Iskandar et al., "Going Social with ReplayKit and Game Center What's new in social gaming", Available online at: http://devstreaming.apple.com/videos/wwdc/2015/6053hq2fz0ebo0lm/605/605_going_socia l_with_replaykit_and_game_center.pdf?dl=1, Jun. 8, 2015, 103 pages.

Itjungles, "Samsung Galaxy S8: How to Assign a Photo to a Contact", Available online at: < https://www.youtube.com/watch?v=2ZdwxijxDzE>, Feb. 13, 2018, 3 pages.
Itjungles, "Samsung Galaxy S9: How to Add Stickers to Text Messages", Available online at: https://www.youtube.com/watch?v=ojGC_UMQds0, Jan. 22, 2019, 3 pages.
Jabbari Ibrahim, "How to set up Google Gboard's 'Mini' stickers", Available online at: https://www.youtube.com/watch?v=z_sWkctRr8Q, Aug. 30, 2018, 3 pages.
Latest Technology, "How to Create Personalized Emojis on Gboard Using Your Selfies II Personal Emojis", Available online at: https://www.youtube.com/watch?v=udyom84oqqA, Nov. 1, 2018, 3 pages.
McGrenere et al., "Affordances: Clarifying and Evolving a Concept", Proceedings of Graphics Interface 2000, May 2000, 8 pages.
Microsoft Press Store, "Adding, Removing, and Managing Programs in Windows 7", Available online at: <https://www.microsoftpressstore.com/articles/printerfriendly/2231013>, Sep. 23, 2009, 17 pages.
Minutes of the Oral Proceedings received for European Patent Application No. 18154163.2, mailed on May 17, 2019, 7 pages.
Minutes of the Oral Proceedings received for European Patent Application No. 20180033.1, mailed on Mar. 25, 2022, 15 pages.
Modestneko, "How to Use Facerig", Available Online at: https://www.youtube.com/watch?v=e25_nuRNIOM, Mar. 31, 2019, 4 pages.
Nathan B Tech, "New Samsung S10 AR Emojis In Depth", Available online at: https://www.youtube.com/watch?v=xXeNSuNoEHc, Mar. 17, 2019, 4 pages.
Nineverything, "Making a Mii on Switch—all of the options", Online available at: https://www.youtube.com/watch?v=kUDPmbBK7ys, Feb. 23, 2017, 3 pages.
Non-Final Office Action received for U.S. Appl. No. 14/869,715, dated Jan. 29, 2016, 62 pages.
Non-Final Office Action received for U.S. Appl. No. 14/863,616, dated Mar. 21, 2018, 17 pages.
Non-Final Office Action received for U.S. Appl. No. 14/864,770, dated Sep. 25, 2017, 14 pages.
Non-Final Office Action received for U.S. Appl. No. 14/869,715, dated Oct. 11, 2016, 37 pages.
Non-Final Office Action Received for U.S. Appl. No. 14/871,635, dated May 5, 2017, 23 pages.
Non-Final Office Action Received for U.S. Appl. No. 14/871,635, dated Nov. 16, 2018, 36 pages.
Non-Final Office Action Received for U.S. Appl. No. 14/871,654, dated May 4, 2017, 23 pages.
Non-Final Office Action received for U.S. Appl. No. 15/291,829, dated Jul. 27, 2021, 25 pages.
Non-Final Office Action received for U.S. Appl. No. 15/291,829, dated Nov. 8, 2019, 23 pages.
Non-Final Office Action received for U.S. Appl. No. 15/291,829, dated Nov. 24, 2020, 27 pages.
Non-Final Office Action received for U.S. Appl. No. 16/367,702, dated Mar. 9, 2020, 17 pages.
Non-Final Office Action received for U.S. Appl. No. 16/367,702, dated Mar. 19, 2021, 18 pages.
Non-Final Office Action received for U.S. Appl. No. 16/582,500, dated Jun. 2, 2020, 15 pages.
Non-Final Office Action received for U.S. Appl. No. 16/583,706, dated Jan. 10, 2020, 27 pages.
Non-Final Office Action received for U.S. Appl. No. 16/583,706, dated Mar. 4, 2021, 34 pages.
Non-Final Office Action received for U.S. Appl. No. 15/291,829, dated Dec. 14, 2018, 22 pages.
Non-Final Office Action received for U.S. Appl. No. 14/863,616, dated Nov. 21, 2016, 16 pages.
Norman Don, "The Design of Everyday Things", 2013, pp. 1-5.
Notice of Allowance received for Chinese Patent Application No. 201610371856.9, dated May 11, 2020, 2 pages.
Notice of Allowance received for Chinese Patent Application No. 201680031372.8, dated Sep. 24, 2020, 2 pages.
Notice of Allowance received for Chinese Patent Application No. 202010776600.2, dated Apr. 1, 2021, 8 pages.
Notice of Allowance received for Japanese Patent Application No. 2017-562050, dated Jun. 1, 2020, 4 pages.

(56) References Cited

OTHER PUBLICATIONS

Notice of Allowance received for Japanese Patent Application No. 2018-008937, dated Jul. 2, 2018, 4 pages.
Notice of Allowance received for Japanese Patent Application No. 2020-010992, dated Jun. 27, 2022, 4 pages.
Notice of Allowance received for Korean Patent Application No. 10-2017-7034677, dated May 27, 2019, 5 pages.
Notice of Allowance received for Korean Patent Application No. 10-2018-7001854, dated Aug. 21, 2018, 4 pages.
Notice of Allowance received for Korean Paten Application No. 10-2019-7025322, dated Nov. 20, 2019, 5 pages.
Notice of Allowance received for Korean Patent Application No. 10-2020-7004737, dated Mar. 31, 2020, 4 pages.
Notice of Allowance received for U.S. Appl. No. 14/863,616, dated Dec. 11, 2018, 8 pages.
Notice of Allowance received for U.S. Appl. No. 14/864,770, dated Mar. 28, 2018, 8 pages.
Notice of Allowance received for U.S. Appl. No. 14/869,715, dated Dec. 19, 2017, 32 pages.
Notice of Allowance received for U.S. Appl. No. 14/871,635, dated Feb. 3, 2020, 3 pages.
Notice of Allowance received for U.S. Appl. No. 14/871,635, dated Jan. 15, 2020, 3 pages.
Notice of Allowance Received for U.S. Appl. No. 14/871,635, dated Nov. 14, 2019, 14 pages.
Notice of Allowance received for U.S. Appl. No. 14/871,654, dated May 22, 2018. 22 pages.
Notice of Allowance received for U.S. Appl. No. 15/291,829, dated Oct. 4, 2022, 10 pages.
Notice of Allowance received for U.S. Appl. No. 16/582,570, dated Mar. 6, 2020, 28 pages.
Notice of Allowance received for U.S. Appl. No. 16/814,226, dated Dec. 30, 2021, 24 pages.
Office Action received for Australian Patent Application No. 2016100795, dated Aug. 12, 2016, 6 pages.
Office Action received for Australian Patent Application No. 2016100795, dated Feb. 6, 2017, 3 pages.
Office Action received for Australian Patent Application No. 2016270775, dated May 29, 2019, 3 pages.
Office Action received for Australian Patent Application No. 2016270775, dated Nov. 26, 2018, 5 pages.
Office Action received for Australian Patent Application No. 2016270775, dated Nov. 26, 2019, 3 pages.
Office Action received for Australian Patent Application No. 2017100328, dated May 16, 2017, 3 pages.
Office Action received for Australian Patent Application No. 2017100328, dated Oct. 16, 2017, 6 pages.
Office Action received for Australian Patent Application No. 2018200485, dated Feb. 20, 2019, 6 pages.
Office Action received for Australian Patent Application No. 2018200485, dated Mar. 15, 2018, 3 pages.
Office Action received for Australian Patent Application No. 2018200485, dated Mar. 15, 2019, 4 pages.
Office Action received for Australian Patent Application No. 2019271927, dated Feb. 10, 2021, 5 pages.
Office Action received for Chinese Patent Application No. 201610371856.9, dated Dec. 18, 2019, 6 pages.
Office Action received for Chinese Patent Application No. 201610371856.9, dated Dec. 19, 2018, 12 pages.
Office Action received for Chinese Patent Application No. 201610371856.9, dated Jul. 10, 2019, 6 pages.
Office Action received for Chinese Patent Application No. 201620509362.8, dated Feb. 10, 2017, 2 pages.
Office Action received for Chinese Patent Application No. 201620509362.8, dated Oct. 21, 2016, 3 pages.
Office Action Received for Chinese Patent Application No. 201680031372.8, dated Dec. 6, 2018, 15 pages.
Office Action received for Chinese Patent Application No. 201680031372.8, dated Jun. 19, 2020, 6 pages.
Office Action received for Chinese Patent Application No. 201680031372.8, dated Sep. 29, 2019, 6 pages.
Office Action Received for Danish Patent Application No. PA 201670709, dated Jul. 21, 2017, 4 pages.
Office Action Received for Danish Patent Application No. PA 201670709, dated Nov. 30, 2016, 10 pages.
Office Action received for Danish Patent Application No. PA201670363, dated Feb. 12, 2018, 2 pages.
Office Action received for Danish Patent Application No. PA201670363, dated Jun. 1, 2017, 5 pages.
Office Action received for Danish Patent Application No. PA201670363, dated Nov. 4, 2016, 11 pages.
Office Action received for Danish Patent Application No. PA201670710, dated Dec. 8, 2016, 10 pages.
Office Action received for Danish Patent Application No. PA201670710, dated Sep. 25, 2017, 6 pages.
Office Action received for Danish Patent Application No. PA201970530, dated Mar. 4, 2020, 4 pages.
Office Action received for Danish Patent Application No. PA201970530, dated Mar. 25, 2021, 4 pages.
Office Action received for Danish Patent Application No. PA201970531, dated Feb. 17, 2020, 3 pages.
Office Action received for European Patent Application No. 16803996.4, dated Nov. 29, 2018, 12 pages.
Office Action received for European Patent Application No. 18154163.2, dated Apr. 11, 2018, 6 pages.
Office Action received for European Patent Application No. 20180033.1, dated Jul. 17, 2020, 7 pages.
Office Action received for European Patent Application No. 20722020.3, dated May 12, 2021, 9 pages.
Office Action received for Japanese Patent Application No. 2017-562050, dated Feb. 1, 2019, 15 pages.
Office Action received for Japanese Patent Application No. 2017-562050, dated Sep. 30, 2019, 5 pages.
Office Action received for Korean Patent Application No. 10-2017-7034677, dated Nov. 1, 2018, 5 pages.
Office Action received for Korean Patent Application No. 10-2018-7001854, dated Apr. 2, 2018, 13 pages.
Onescreen Solutions, "Screen Skill: Screen Recorder", Available online at: https://www.youtube.com/watch?v=11NAXh_ZkkU, Oct. 22, 2013, 3 pages.
Preliminary Opinion before oral proceedings received for European Patent Application No. 18154163.2, dated Apr. 16, 2019, 12 pages.
Result of Consultation received for European Patent Application No. 16803996.4, mailed on Feb. 17, 2020, 14 pages.
Russell Kyle, "Kamcord Launches on Android With a Streamlined Video Capture Experience", Available Online at: https://techcrunch.com/2015/06/02/kamcord-launches-on-android-with-a-streamlined-video-capture-experience/, Jun. 2, 2015, 2 pages.
Russell Kyle, "Kamcord Now Lets Users Upload Edited Videos of Their Mobile Gaming Sessions", Available online at: https://techcrunch.com/2015/03/31/kamcord-now-lets-users-upload-edited-videos-of-their-mobile-gaming-sessions/, Mar. 31, 2015, 2 pages.
Search Report and Opinion received for Danish Patent Application No. PA201970530, dated Oct. 11, 2019, 8 pages.
Search Report and Opinion received for Danish Patent Application No. PA201970531, dated Oct. 11, 2019, 9 pages.
Smart Card Alliance, "Security of Proximity Mobile Payments", Online Available at: https://www.securetechalliance.org/resources/pdf/Security_of_Proximity_Mobile_Payments. pdf, May 2009, pp. 1-39.
Stimac Blake, "How to set and clear default applications in Android", retrieved from <https://www.greenbot.com/article/2151008/how-to-set-and-clear-default-applications-in-android.html>, May 6, 2014, pp. 1-7.
Summons to Attend Oral Proceedings received for European Patent Application No. 16803996.4, mailed on Oct. 2, 2019, 16 pages.
Summons to Attend Oral Proceedings received for European Patent Application No. 18154163.2, mailed on Nov. 29, 2018, 9 pages.
Summons to Attend Oral Proceedings received for European Patent Application No. 20180033.1, mailed on Oct. 4, 2021, 9 pages.

(56) References Cited

OTHER PUBLICATIONS

Swaney et al., "Dynamic Web File Format Transformations with Grace", 5th International Web Archiving Workshop and Digital Preservation (IWAW 05), Dec. 16, 2005, 12 pages.
Switchforce, "Nintendo Switch Mii Creation+ NEW Mii Options and Poses", Online Available at: https://www.youtube.com/watch?v=n4ZFuaf2k4M, Feb. 23, 2017, 8 pages.
Tech With Brett, "How to Create Your AR Emoji on the Galaxy S9 and S9+", Available online at: < https://www.youtube.com/watch?v=HHMdcBpC8MQ>, Mar. 16, 2018, 5 pages.
Wan Adrian, "Game recording service Kamcord 'investing heavily' as China's mobile gaming market overtakes US", Available online at: http://www.scmp.com/tech/apps-gaming/article/1814442/game-recording-service-kamcord-investing-heavily-chinas-mobile, Jun. 4, 2015, 4 pages.
Wikihow, "How to Change the Default Text Messaging App on an Android Phone", Available online at: < https://www.wikihow.com/Change-the-Default-Text-Messaging-App-on-an-Android-Phone>, May 18, 2015, 2 pages.
Applicant-Initiated Interview Summary received for U.S. Appl. No. 16/582,500, dated May 4, 2023, 3 pages.
Applicant-Initiated Interview Summary received for U.S. Appl. No. 17/517,537, dated May 1, 2023, 2 pages.
Office Action received for Australian Patent Application No. 2022200239, dated Mar. 22, 2023, 3 pages.
Corrected Notice of Allowance received for U.S. Appl. No. 17/586,235, dated Jun. 28, 2023, 2 pages.
Office Action received for Australian Patent Application No. 2022200239, dated Jun. 29, 2023, 3 pages.
Summons to Oral Proceedings received for European Patent Application No. 16803996.4, mailed on Jun. 28, 2023, 15 pages.
Summons to Oral Proceedings received for European Patent Application No. 20180033.1, mailed on Jun. 28, 2023, 16 pages.
Intention to Grant received for European Patent Application No. 20722020.3, dated Jun. 7, 2023, 10 pages.
Notice of Allowance received for Japanese Patent Application No. 2022-064586, dated May 29, 2023, 4 pages (1 page of English Translation and 3 pages of Official Copy).
Notice of Allowance received for U.S. Appl. No. 17/586,235, dated May 30, 2023, 17 pages.
Applicant-Initiated Interview Summary received for U.S. Appl. No. 16/582,500, dated Aug. 1, 2023, 2 pages.
Examiner's Answer to Appeal Brief received for U.S. Appl. No. 16/583,706, dated Aug. 1, 2023, 29 pages.
IGN, "Create a Sim", The Sims 4 Wiki Guide, Available Online at: https://www.ign.com/wikis/the-sims-4/Create_a_Sim, Jun. 27, 2018, 17 pages.
Office Action received for Australian Patent Application No. 2023200867, dated Jul. 21, 2023, 3 pages.
Applicant-Initiated Interview Summary received for U.S. Appl. No. 16/582,500, dated Apr. 14, 2023, 4 pages.
Applicant-Initiated Interview Summary received for U.S. Appl. No. 17/586,235, dated Apr. 25, 2023, 3 pages.
Office Action received for Japanese Patent Application No. 2022-064586, dated Apr. 10, 2023, 4 pages (2 pages of English Translation and 2 pages of Official Copy).
Non-Final Office Action received for U.S. Appl. No. 16/582,500, dated Oct. 13, 2023, 25 pages.
Applicant-Initiated Interview Summary received for U.S. Appl. No. 16/367,702, dated Aug. 3, 2021, 2 pages.
Applicant-Initiated Interview Summary received for U.S. Appl. No. 16/582,500, dated Oct. 28, 2022, 6 pages.
Applicant-Initiated Interview Summary received for U.S. Appl. No. 16/814,226, dated Aug. 30, 2021, 3 pages.
Applicant-Initiated Interview Summary received for U.S. Appl. No. 17/517,537, dated Nov. 28, 2022, 2 pages.
Applicant-Initiated Interview Summary received for U.S. Appl. No. 17/586,235, dated Jan. 25, 2023, 3 pages.
Corrected Notice of Allowance received for U.S. Appl. No. 16/814,226, dated Jan. 18, 2022, 21 pages.
Corrected Notice of Allowance received for U.S. Appl. No. 16/814,226, dated Jan. 27, 2022, 2 pages.
Decision to Grant received for European Patent Application No. 16808015.8, dated Nov. 25, 2021, 2 pages.
Examiner-Initiated Interview Summary received for U.S. Appl. No. 16/814,226, dated Nov. 15, 2021, 2 pages.
Extended European Search Report received for European Patent Application No. 22191851.9, dated Nov. 17, 2022, 8 pages.
Final Office Action received for U.S. Appl. No. 16/582,500, dated Feb. 3, 2023, 24 pages.
Final Office Action received for U.S. Appl. No. 16/583,706, dated Feb. 17, 2023, 38 pages.
Final Office Action received for U.S. Appl. No. 16/583,706, dated Nov. 18, 2021, 39 pages.
Final Office Action received for U.S. Appl. No. 16/814,226, dated Oct. 28, 2021, 19 pages.
Final Office Action received for U.S. Appl. No. 17/517,537, dated Feb. 17, 2023, 15 pages.
Final Office Action received for U.S. Appl. No. 17/586,235, dated Mar. 8, 2023, 23 pages.
Intention to Grant received for European Patent Application No. 16808015.8, dated Jul. 30, 2021, 8 pages.
International Preliminary Report on Patentability received for PCT Patent Application No. PCT/US2020/025913, dated Nov. 18, 2021, 11 pages.
Non-Final Office Action received for U.S. Appl. No. 16/582,500, dated Sep. 17, 2021, 18 pages.
Non-Final Office Action received for U.S. Appl. No. 16/582,500, dated Sep. 23, 2022, 23 pages.
Non-Final Office Action received for U.S. Appl. No. 16/814,226, dated Jul. 13, 2021, 17 pages.
Non-Final Office Action received for U.S. Appl. No. 17/517,537, dated Sep. 22, 2022, 13 pages.
Non-Final Office Action received for U.S. Appl. No. 17/586,235, dated Dec. 2, 2022, 54 pages.
Notice of Acceptance received for Australian Patent Application No. 2020269590, dated Nov. 8, 2022, 3 pages.
Notice of Allowance received for Japanese Patent Application No. 2021-566102, dated Oct. 28, 2022, 5 pages (1 page of English Translation and 4 pages of Official Copy).
Office Action received for Australian Patent Application No. 2019271927, dated Dec. 17, 2021, 4 pages.
Office Action received for Australian Patent Application No. 2019271927, dated Sep. 8, 2021, 4 pages.
Office Action received for Australian Patent Application No. 2020269590, dated Sep. 16, 2022, 2 pages.
Office Action received for Australian Patent Application No. 2022200239, dated Jan. 11, 2023, 4 pages.
Office Action received for Danish Patent Application No. PA201970531, dated Aug. 13, 2021, 3 pages.
Office Action received for Japanese Patent Application No. 2020-010992, dated Jan. 28, 2022, 6 pages (3 pages of English Translation and 3 pages of Official Copy).
Office Action received for Japanese Patent Application No. 2020-010992, dated May 24, 2021, 9 pages (4 pages of English Translation and 5 pages of Official Copy).
Reallusion, "CrazyTalk 8 Tutorial—Customizing Eyes and Teeth", Online available at: https://www.youtube.com/watch?v=A9LgNB1PoMY, Dec. 23, 2015, 21 pages.
Space-O Digicom Private Limited, "Tongue Piercing Booth—The Barbell Tongue Rings & Oral Piercings App", May 30, 2017, 5 pages.

* cited by examiner

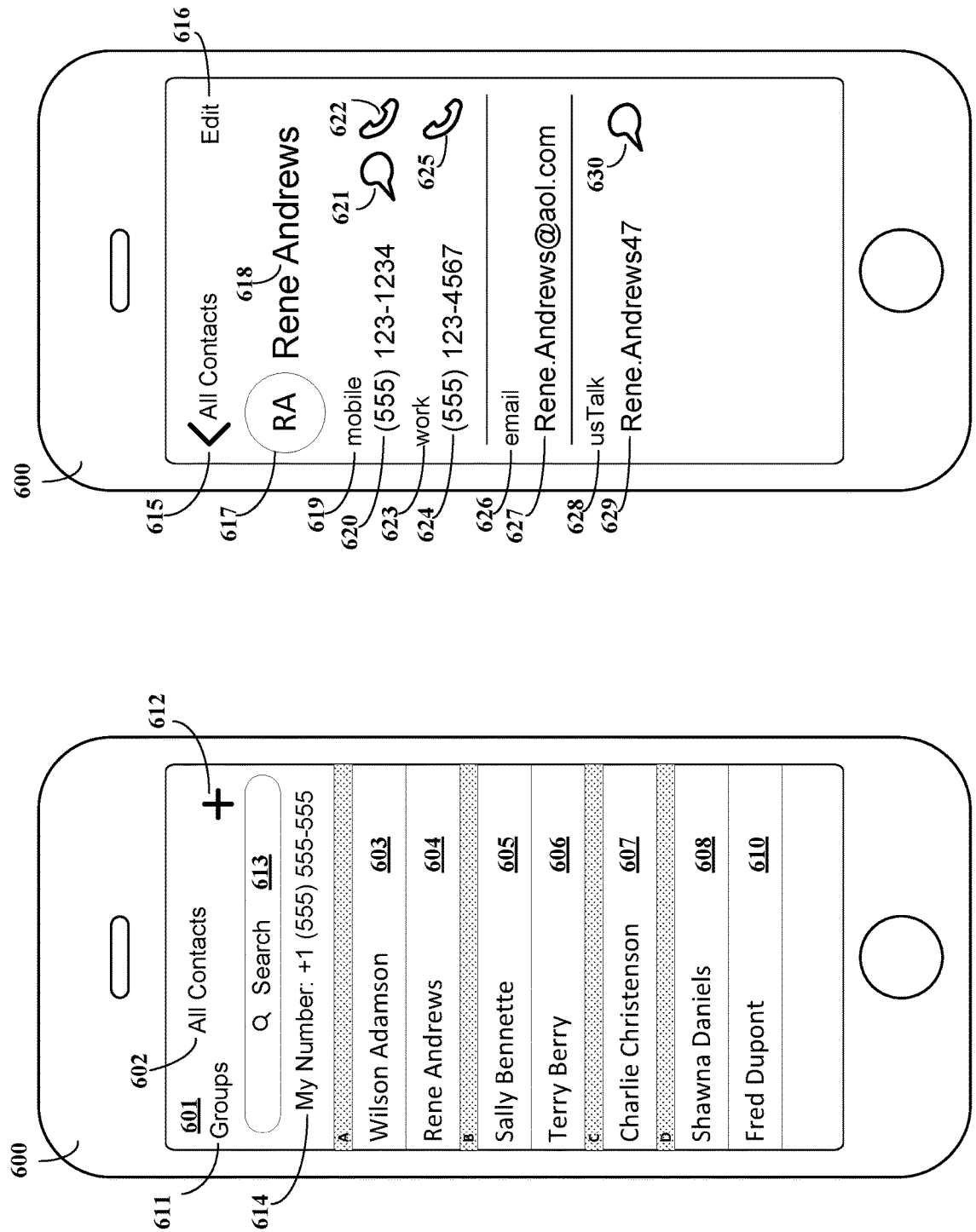

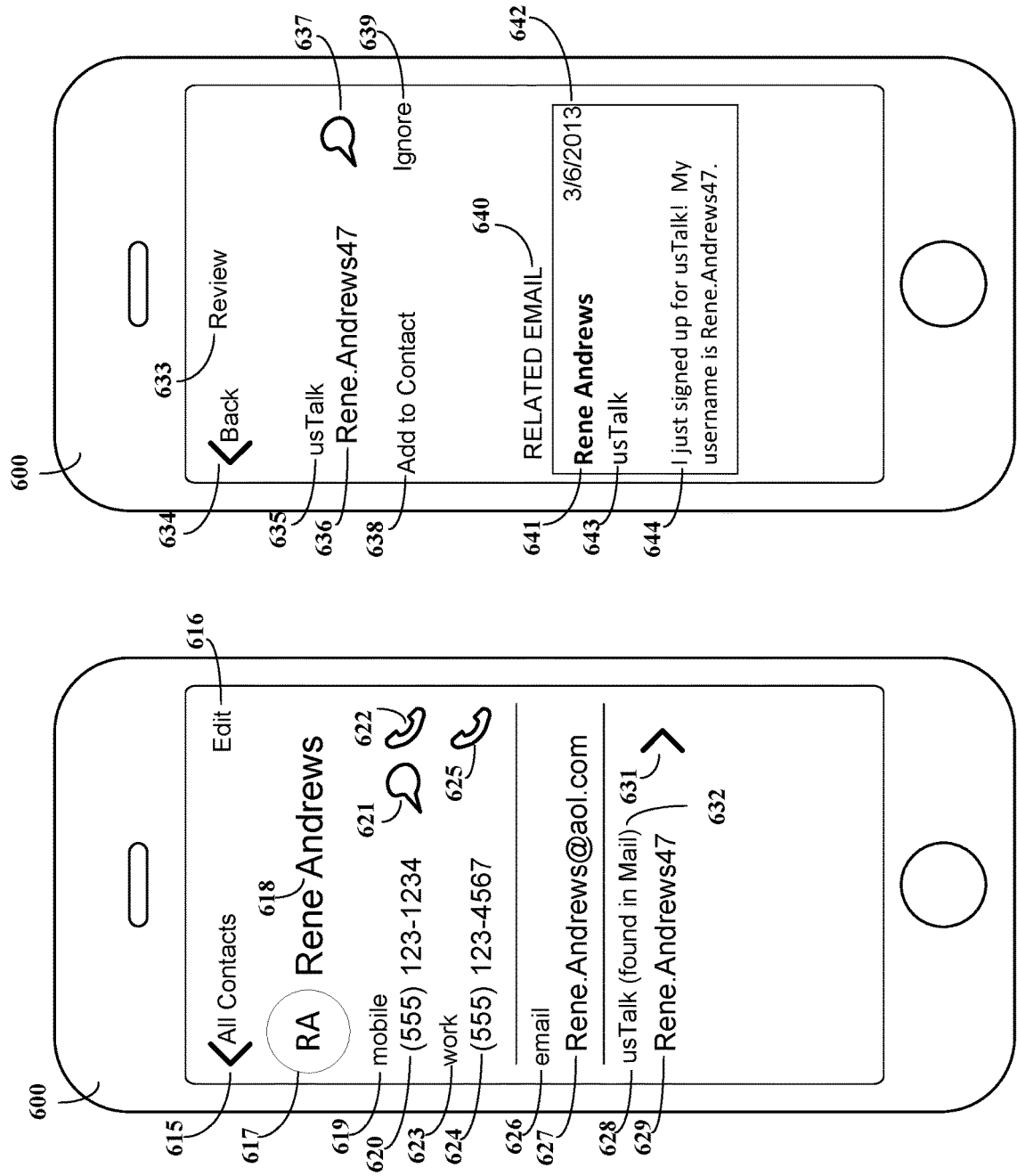

MANAGING CONTACT INFORMATION FOR COMMUNICATION APPLICATIONS

CROSS-REFERENCE TO RELATED APPLICATIONS

This application is a continuation of U.S. patent application Ser. No. 15/291,829, entitled "MANAGING CONTACT INFORMATION FOR COMMUNICATION APPLICATIONS," filed on Oct. 12, 2016, which claims priority to U.S. provisional patent application 62/348,981, entitled "MANAGING CONTACT INFORMATION FOR COMMUNICATION APPLICATIONS," filed on Jun. 12, 2016, the contents of which are hereby incorporated by reference in their entireties.

FIELD

The present disclosure relates generally to computer user interfaces, and more specifically to techniques for managing contact information.

BACKGROUND

Electronic device typically include the ability to communicate in many forms. In addition to communication services provided by first-party applications that come with the electronic device when it is sold, many electronic devices allow for third-party communication applications to be installed that use existing and new communication services. Additional communication services and communication applications increase the amount of contact information on the electronic device.

BRIEF SUMMARY

Some techniques for managing contacts and initiating communications using the contacts using electronic devices, however, are generally cumbersome and inefficient. For example, some existing techniques use a complex and time-consuming user interface, which optionally include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing contacts and initiating communications using the contacts. Such methods and interfaces optionally complement or replace other methods for managing contacts and initiating communications using the contacts. Such methods and interfaces reduce the cognitive burden on a user and produce a more efficient human-machine interface. For battery-operated computing devices, such methods and interfaces conserve power and increase the time between battery charges.

In accordance with embodiments, on a portable electronic device having a display, a plurality of affordances associated with a plurality of contacts is displayed. First user input selecting a first affordance of the plurality of affordances is received for a first contact of the plurality of contacts. In response to receiving the first user input and in accordance with a determination that a first communication application is in a set of communication applications installed on the portable electronic device, a contact information interface is displayed for the first contact. The contact information interface includes a first contact identification field for the first contact. The first contact identification field is associated with the first contact and the first communication application.

In accordance with an embodiment of transitory computer readable storage medium storing one or more programs, the one or more programs comprising instructions, which when executed by one or more processors of an electronic device with a display and one or more input devices, cause the device to: display a plurality of affordances associated with a plurality of contacts; receive first user input selecting a first affordance of the plurality of affordances for a first contact of the plurality of contacts; and in response to receiving the first user input and in accordance with a determination that a first communication application is in a set of communication applications installed on the electronic device, display a contact information interface for the first contact, wherein the contact information interface includes a first contact identification field for the first contact, and wherein the first contact identification field is associated with the first contact and the first communication application.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing contacts and initiating communications using the contacts, thereby increasing the effectiveness, efficiency, and user satisfaction with such devices. Such methods and interfaces may complement or replace other methods for managing contacts and initiating communications using the contacts.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6I illustrate exemplary user interfaces for managing contacts and initiating communications using the contacts.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing contacts and initiating communications using the contacts. For example, there is a need for an integrated and central location to manage contacts and from which communications can be initiated for the contacts using first-party and third-party communication applications and services. Such techniques can reduce the cognitive burden on a user who manages contacts and initiates communications using the contacts, thereby enhancing productivity. Further, such techniques can reduce processor and battery power otherwise wasted on redundant user inputs.

Figure 7B:
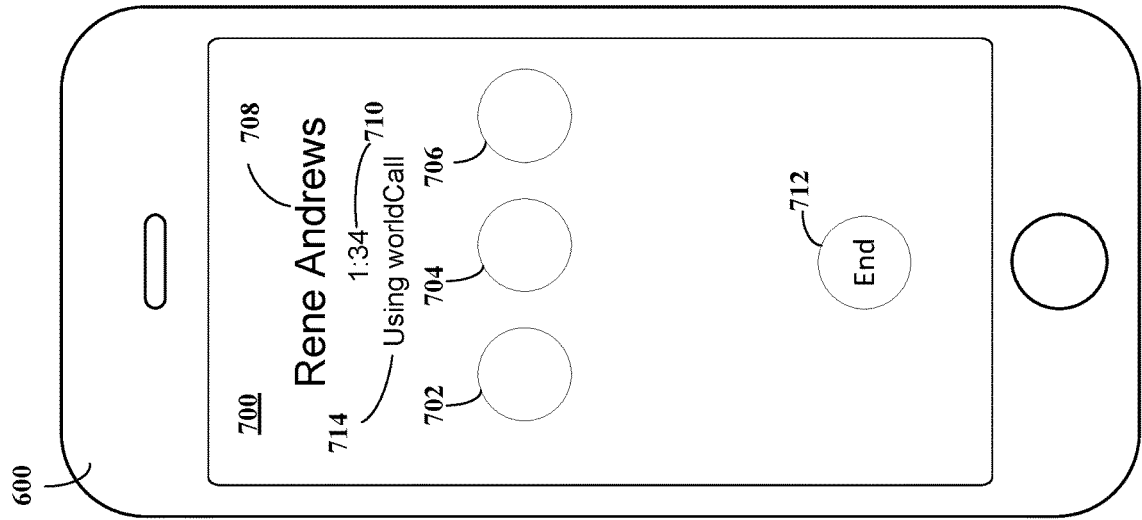
FIGS. 7A-7B illustrate an exemplary user interface for communicating with a contact using first-party and third-party communication services.
Figure 7A:
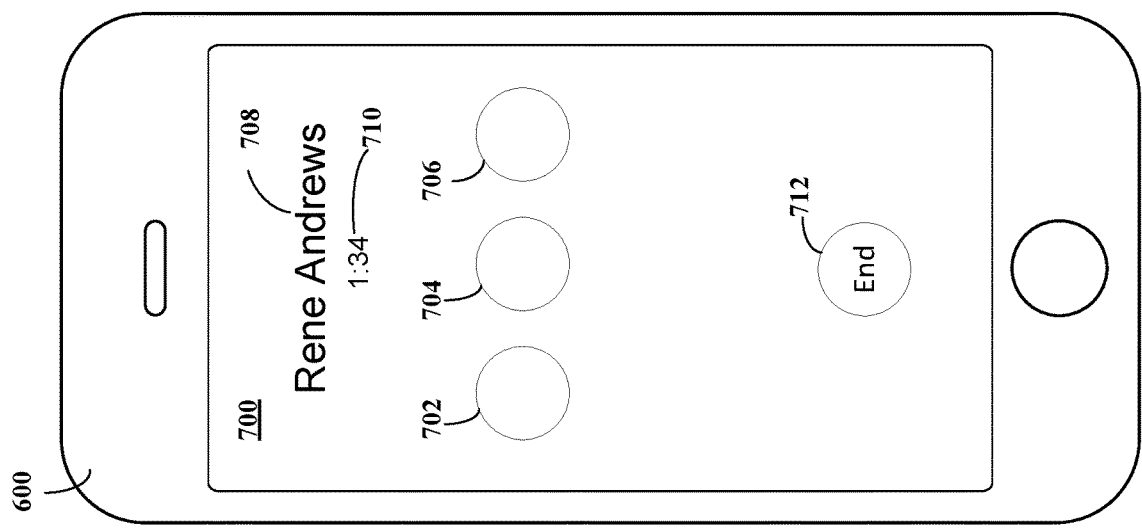
Figure 8:
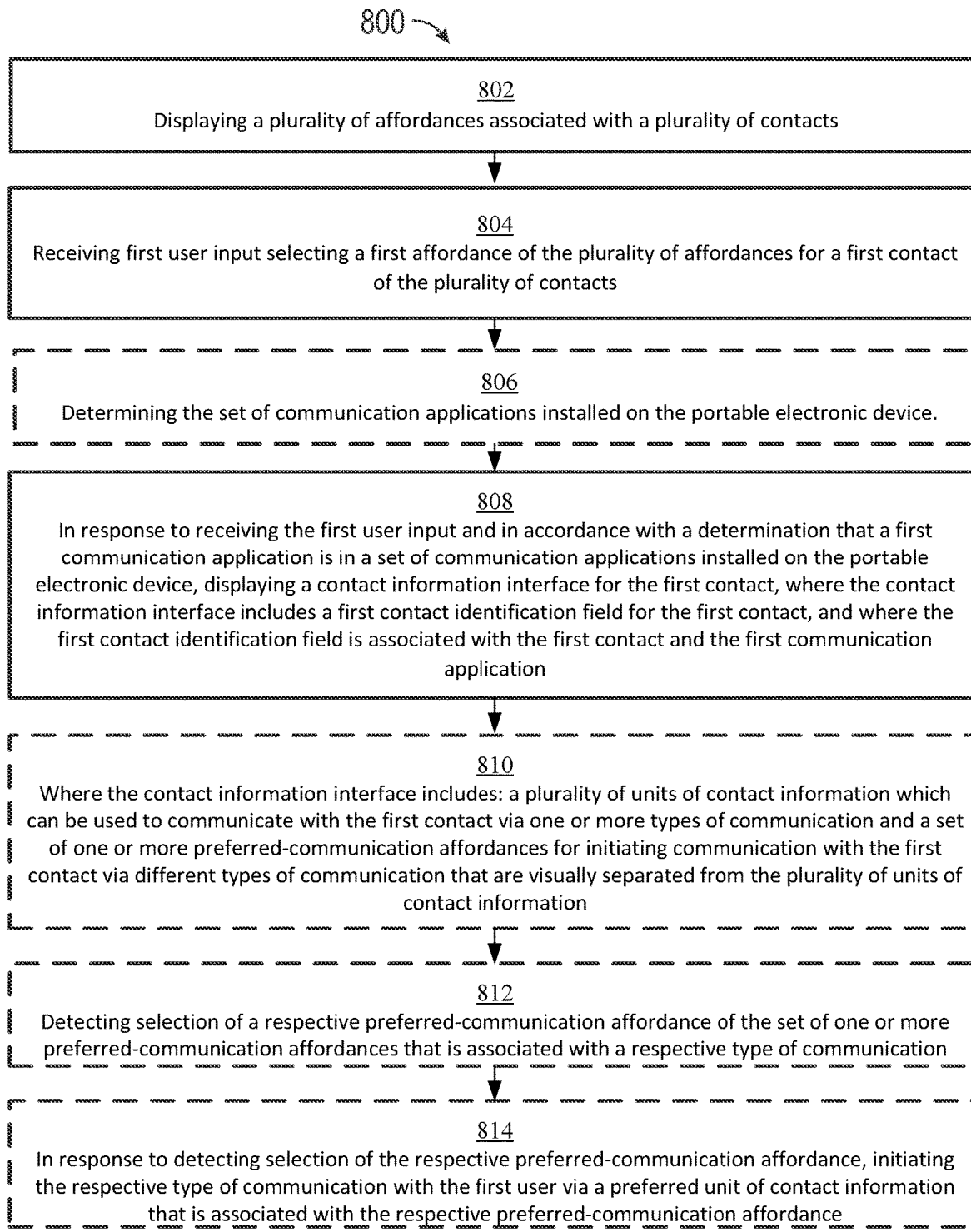
FIG. 8 is a flow diagram illustrating a method for managing contacts and initiating communications using the contacts, in accordance with some embodiments.

Below, FIGS. 1A-1B, 2, 3, 4A-4B, and 5A-5B provide a description of exemplary devices for performing the techniques for managing contacts and initiating communication with contacts. FIGS. 6A-6I and 7A-7B illustrate exemplary user interfaces for managing contacts and initiating communication with contacts. FIG. 8 is a flow diagram illustrating methods of managing event notifications in accordance with some embodiments. The user interfaces in FIGS. 6A-6I and 7A-7B are used to illustrate the processes described below, including the processes in FIG. 8.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
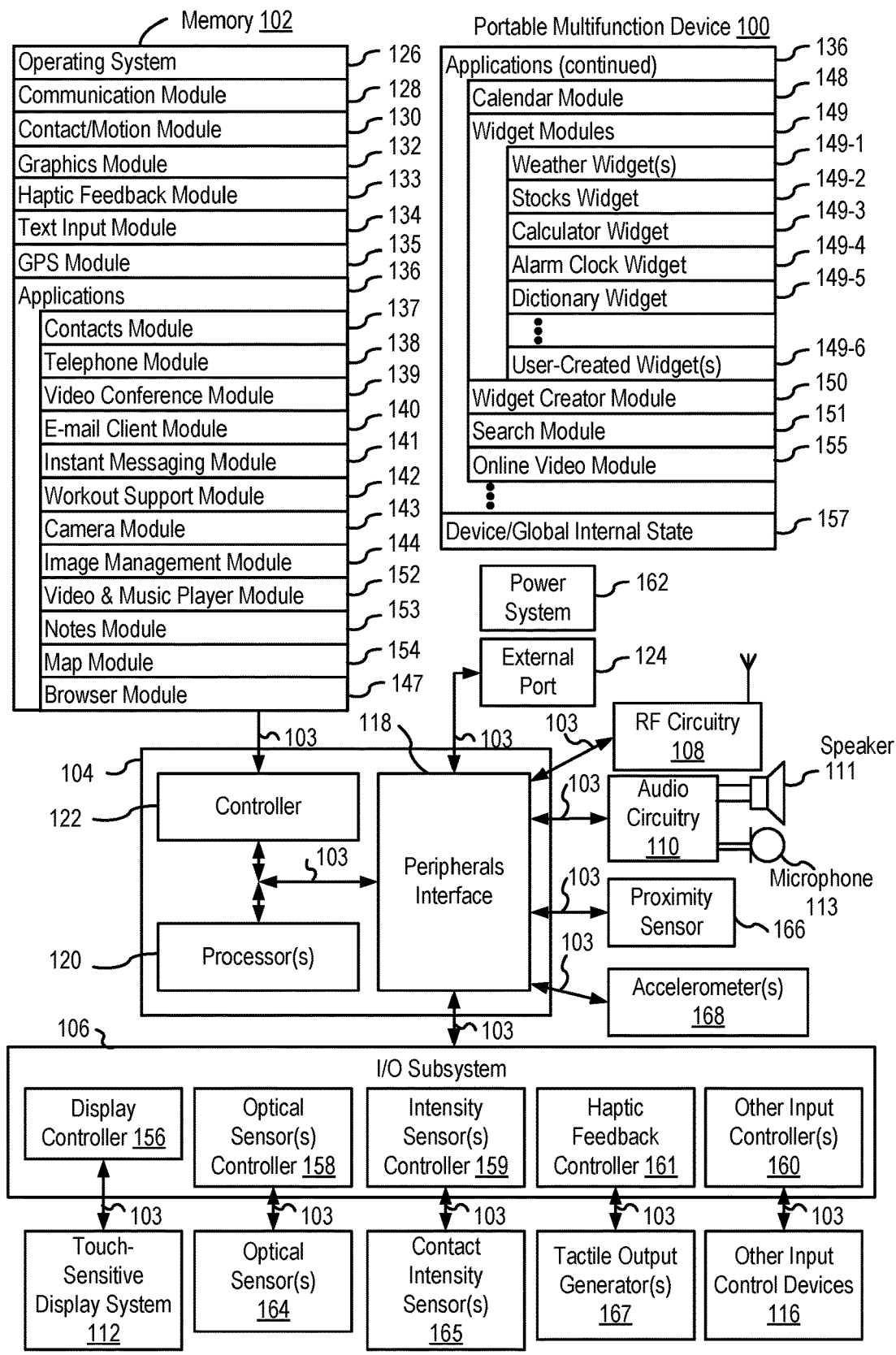
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons is, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
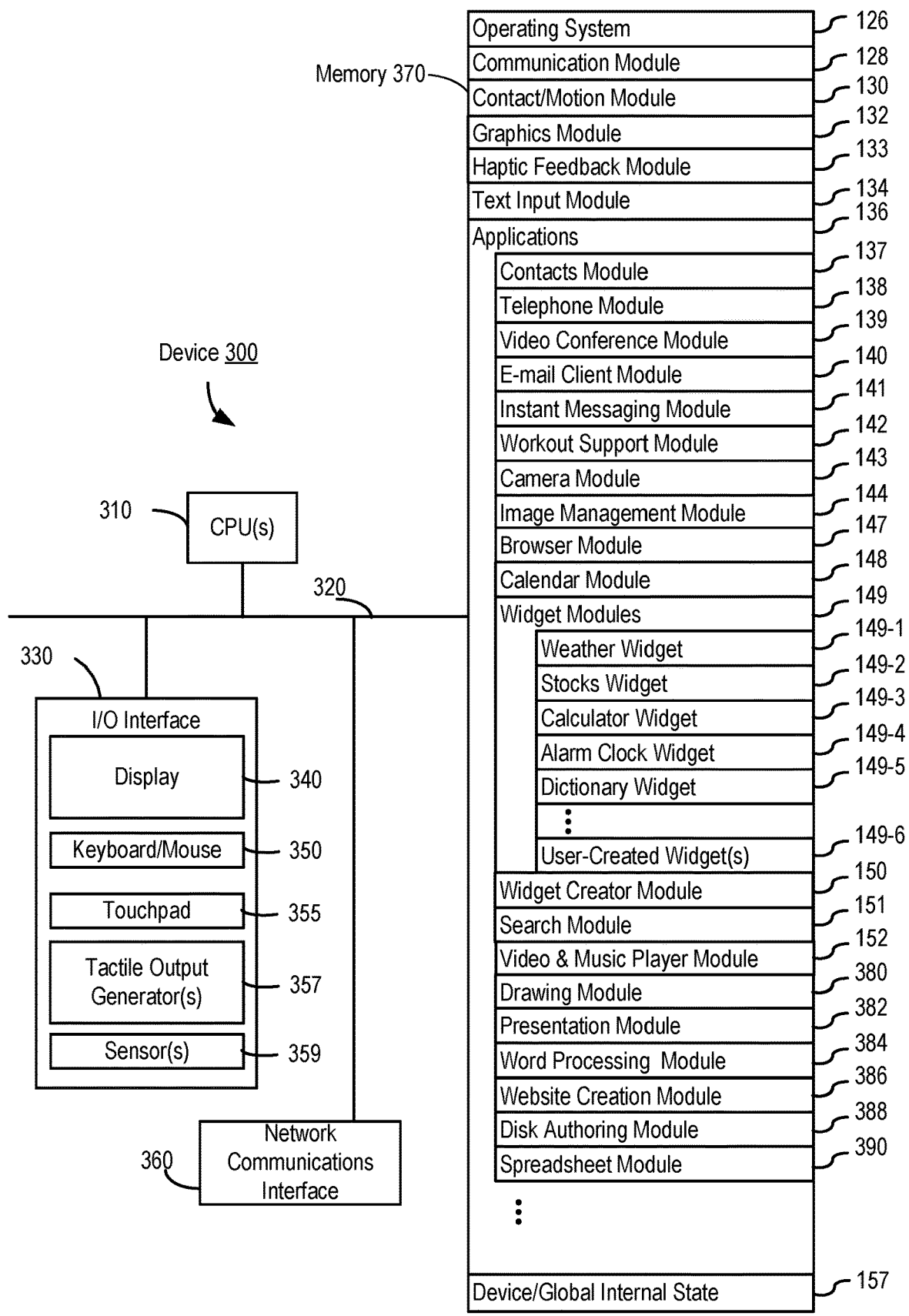
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
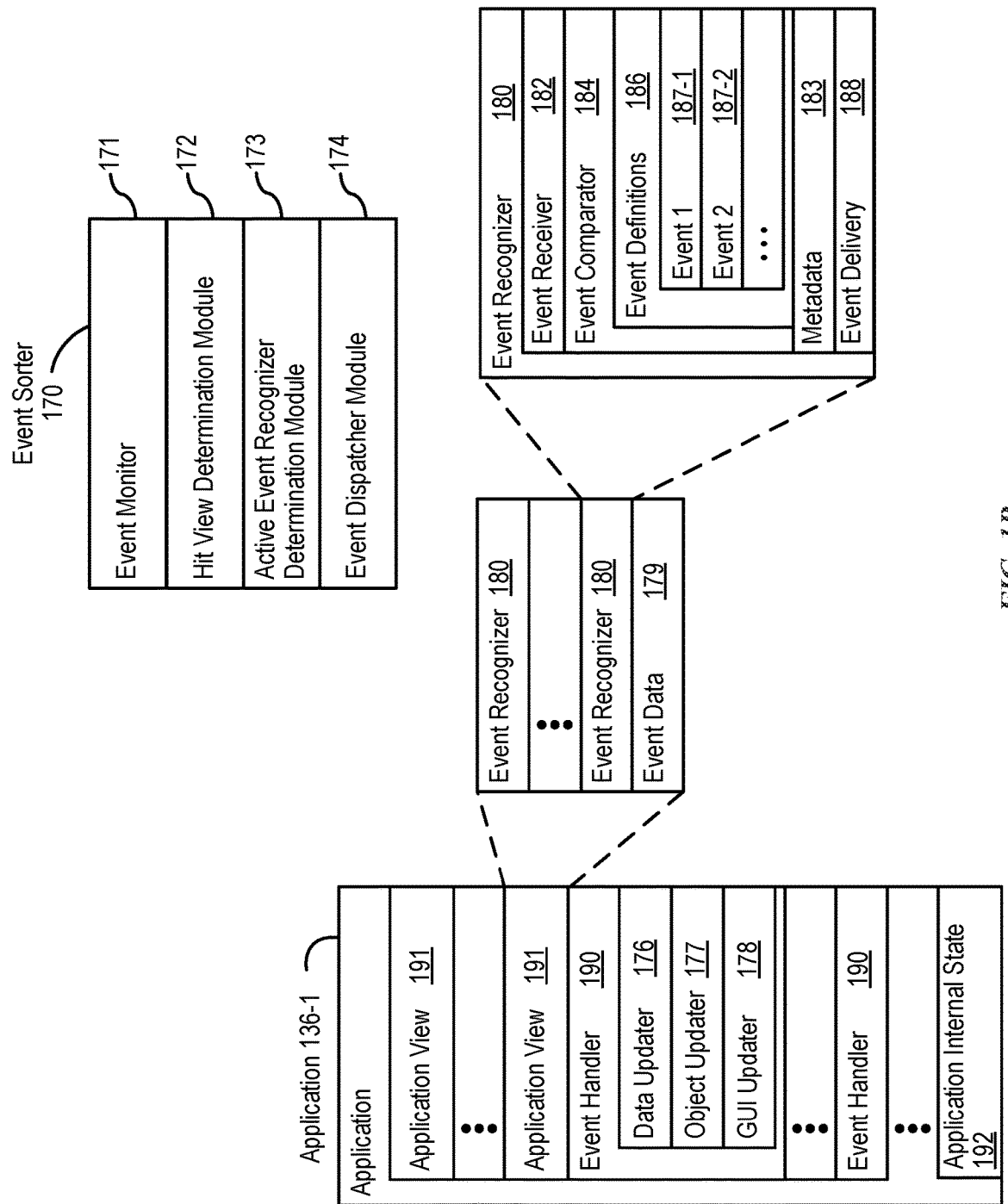
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
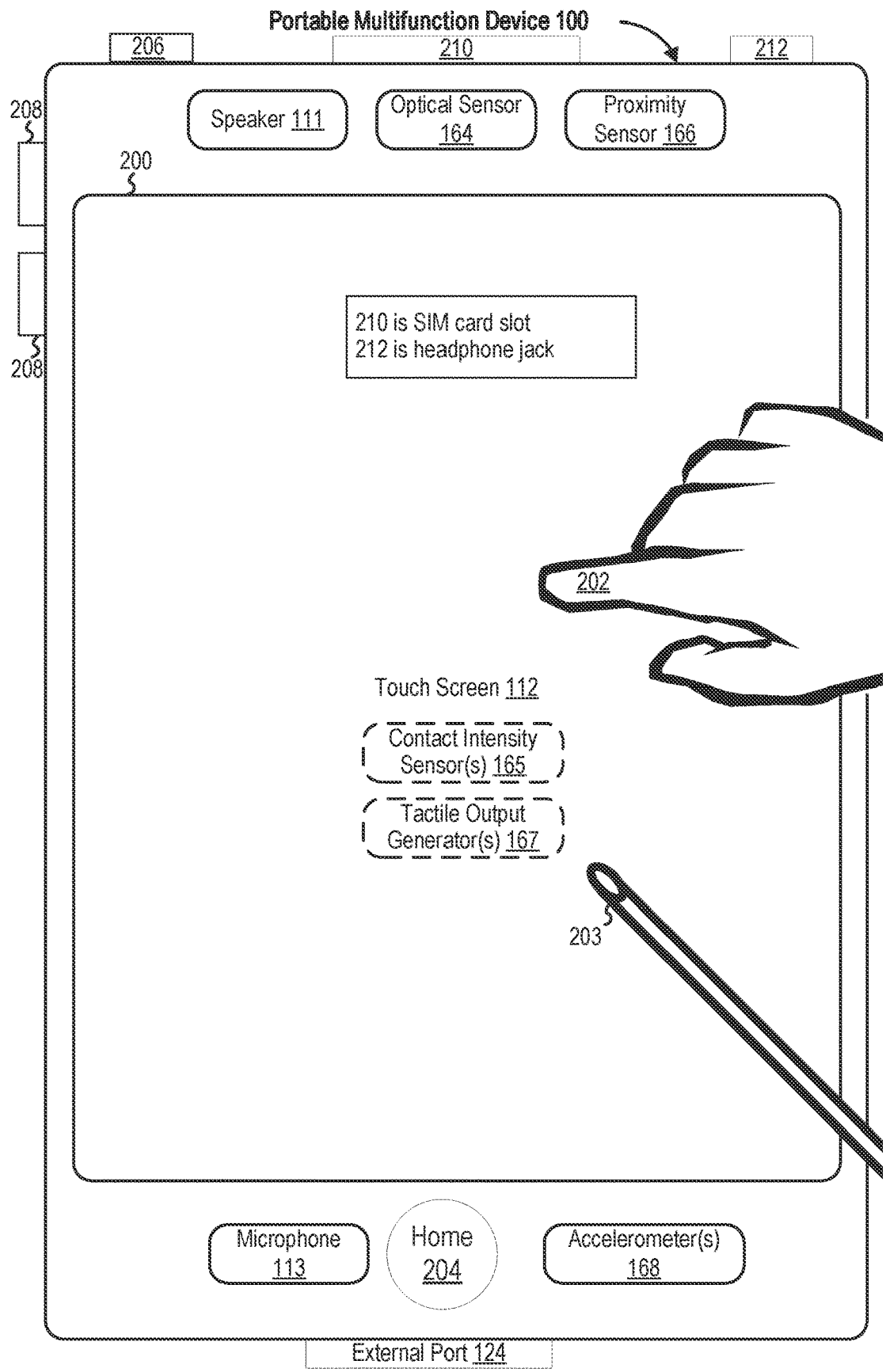
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
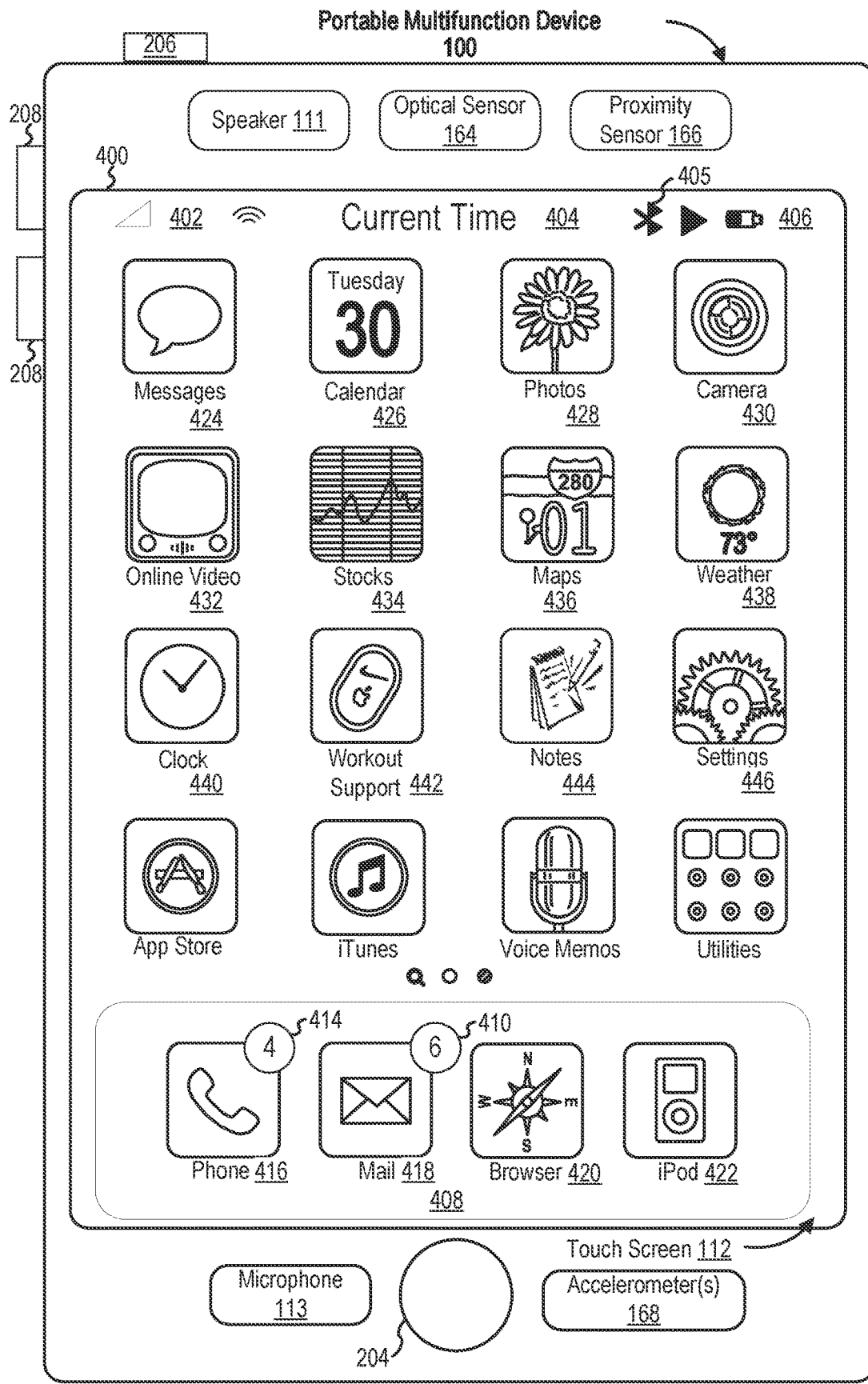
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
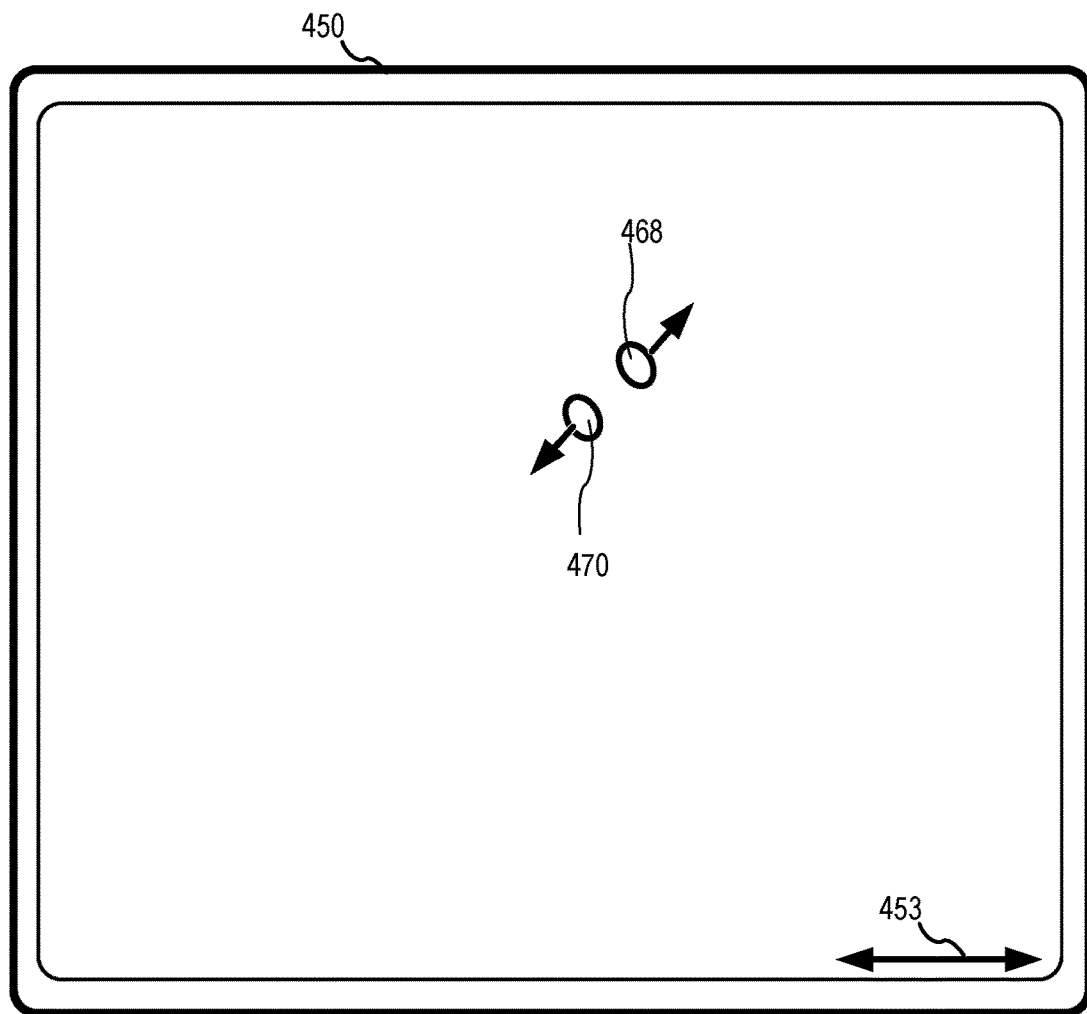
FIG. 4B illustrates an exemplary user interface for a multifunction device with a touch-sensitive surface that is separate from the display in accordance with some embodiments.
Figure 4B:
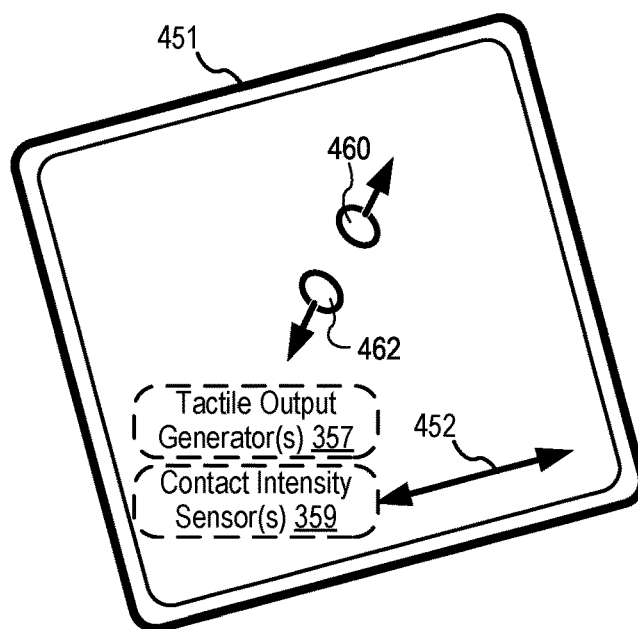

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
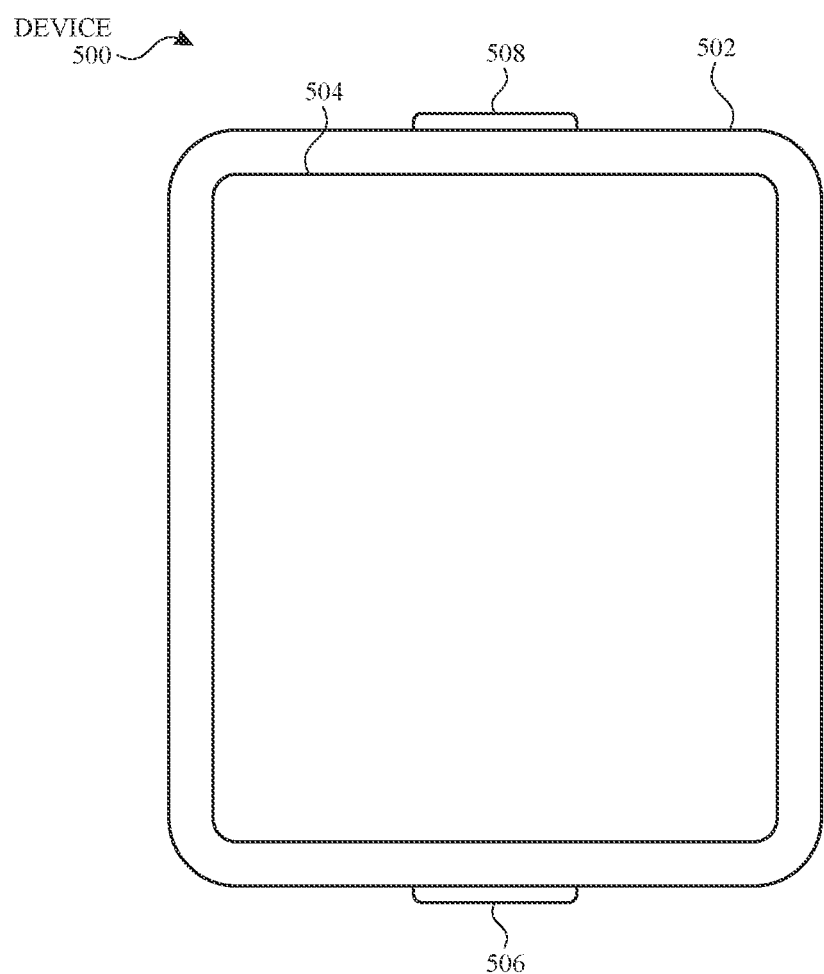
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
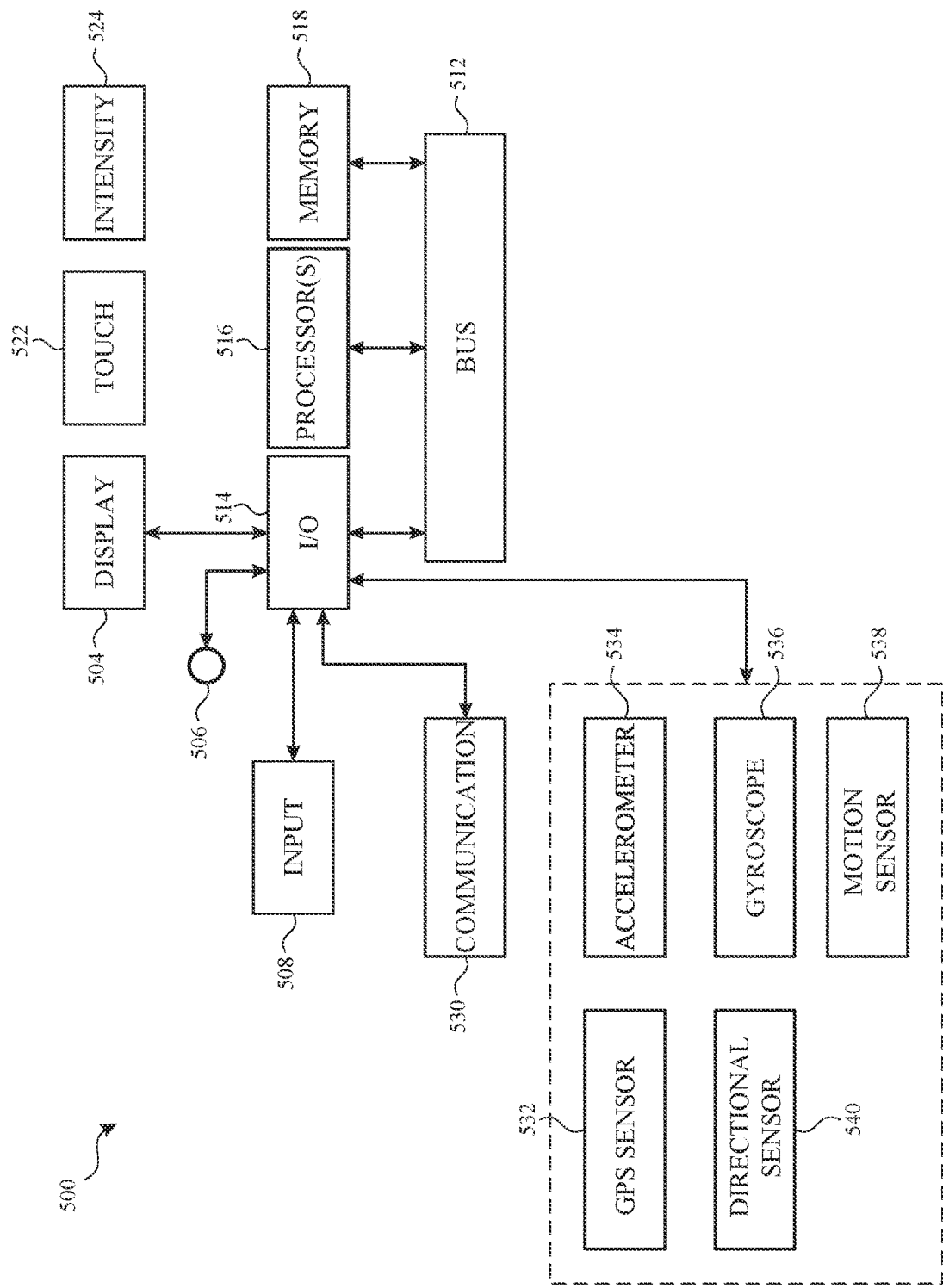
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including method 800 (FIG. 8). Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A-B, 3, and 5A-B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6I illustrate exemplary user interfaces for contacts, in accordance with some embodiments. The user interfaces in these figures are used to illustrate the processes described below, including the processes in FIG. 8.

FIG. 6A depicts portable electronic device 600. In some embodiments, device 600 includes some or all of the features of device 100, device 300, and/or device 500, described above with respect to FIGS. 1A-1B, 2-3, 4A-4B, and 5A-5B.

In accordance with some embodiments, as depicted, in FIG. 6A, portable electronic device 600 is mobile phone displaying user interface 601. As indicated by title 602, user interface 601 includes a plurality of affordances 603-610 that correspond to a plurality of contacts (e.g., affordance 603 corresponding to the contact "Wilson Adamson"). Affordance 611 allows the user to enter an interface for selecting a different group of contacts. Affordance 612 allows the user to enter an interface for adding a new contact to the plurality of contacts. Search interface 613 allows the user to search the plurality of contacts. Element 614 displays the phone number associated with device 600.

Affordances 603-610 allow the user to access a contact information interface (e.g., a contact card) associated with contacts corresponding to the affordances. The contact information interface allows users to access contact information for a particular contact, initiate communication with the contact using the contact information, and/or edit the contact information.

Figure 6F:
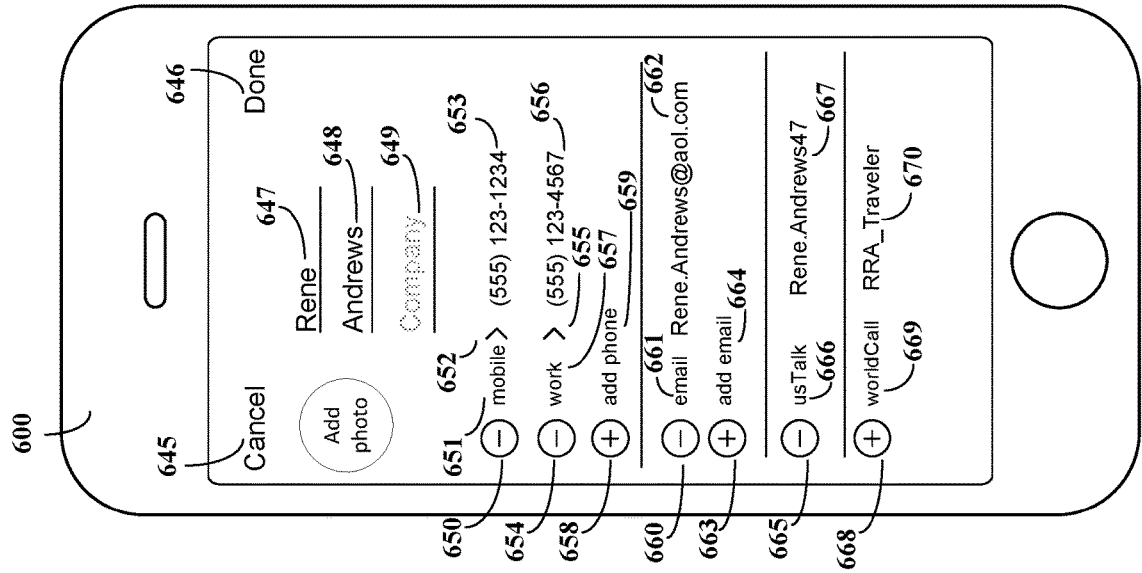

For example, if portable electronic device 600 receives user input selecting affordance 604, the contact information interface for Rene Andrews will be displayed, as depicted in FIG. 6B. In some embodiments, the contact information interface is part of a first-party application installed on portable electronic device 600. The contact information interface depicted in FIG. 6B includes affordance 615 for returning to user interface 601 of FIG. 6A and affordance 616 for entering an editing interface for the contact information, as will be described with respect to FIGS. 6E and 6F. The contact information interface also includes name 618 and icon 617 for the contact. Icon 617 contains the contact's initials. In other examples, it contains a picture for the contact.

The contact information interface of FIG. 6B also includes four contact identification fields that include other information, such as units of contact information (e.g., phone numbers, usernames, addresses, or other contact identifications used for communicating with a contact using a communication service):

number identification 619, unit of contact information 620, and affordances 621 and 622 for initiating communication using first-party applications (using the dialer for affordance 622 and a messaging application for 621) with the contact using the number;

number identification 623, unit of contact information 624, and affordance 625 for initiating a phone call with the contact using the number;

communication type 626 and unit of contact information 627; and application identification 628, unit of contact information 629, and affordance 630 for initiating communication with the contact using the identified third-party application and the username.

In addition to affordances 621, 622, 625, and 630, which are contact interface objects that link to first-party or third-party applications, the entire contact identification fields optionally are also affordances that initiate communication using the information within the fields. For example, user input selecting the field with the email address optionally initiates an email message to the contact using address 627 even though no pictorial affordance is displayed. As another example, user input selecting the field for the chatting application usTalk optionally launches the associated third-party application and initiate a conversation between the user and the first contact for text or image based communication and/or sending a request to the first contact to participate in a live communication such as a voice or video call.

The determination of the contact identification fields that are displayed in a contact information interface optionally relies on various factors. For example, optionally, only those contact information interfaces associated with an application installed on portable electronic device 600 are displayed. In this example, prior to displaying the contact information interface, a determination is made of a set of communication applications that are installed on the portable electronic device. The set of communication applications optionally include various types of applications, such as social networking, voice over IP (VOIP), messaging, video, and/or other types of communications applications. In response to determining that a communication application is installed on portable electronic device 600, a contact identification field associated with that communication application optionally is displayed.

For example, referring back to FIG. 6B, the contact identification field for the usTalk application is displayed because it was a determined that usTalk was installed on portable electronic device 600. This determination can be made using various techniques, such as an API call to the operating system, accessing configuration information in a database, and/or similar techniques. The determination can occur in response to selection of an affordance (e.g., 604) in user interface 601 of FIG. 6A. The determination can also occur at earlier times, such as when applications are installed on portable electronic device 600. If usTalk was not determined to be in the set of installed communication application(s), then the contact identification field for usTalk would not be displayed even if the username was already entered for Rene Andrews. The determination of whether to display a contact identification field can also depend on other factors, such as whether a username, address, number, or other unit of contact information is available in the contact information for a communication application. If a unit of contact information is not available for the communication application, the associated contact identification field optionally is not displayed in the contact information interface.

In some cases, information in a contact identification field optionally is suggested based on the content of communications with the contact or other methods. For example, FIG. 6C is the same as FIG. 6B except indication 632 indicates that the username in the usTalk contact identification field was identified in communications with Rene Andrews. In some embodiments, indication 632 indicates that the user did not manually or affirmatively associate the usTalk username with the contact. Specifically, the username was determined based on an email. In response to receiving user input selecting affordance 613, a review interface is entered describing how this username was determined. FIG. 6D depicts an example of this interface, as indicated by title 633. The review interface includes affordance 634 for returning back to the contact information interface. The review interface also includes a contact identification field that has application identification 635, username 636, and affordance 637 for initiating communication. Affordance 638 allows a user to add the information to the contact so as to remove indication 632 of FIG. 6C. In other words, in response to receiving user input selecting affordance 638 of FIG. 6D, the contact information interface for Rene Andrews will appear as shown in FIG. 6B instead of FIG. 6C. The review interface of FIG. 6D also includes information that describes the communication that was used to determine the username. The information includes identification 640 for the communication application, sender 641, date received 642, subject 643, and message 644.

In addition to suggested contact information based on communications, a communication application can suggest a username for a contact based on information such as other contact information for the contact (e.g., a communication application can suggest a username for the contact for use with the communication application based on a phone number for the contact). The interface for accepting or rejecting the suggested contact information optionally is similar to that described with respect to FIGS. 6C and 6D.

Figure 6E:
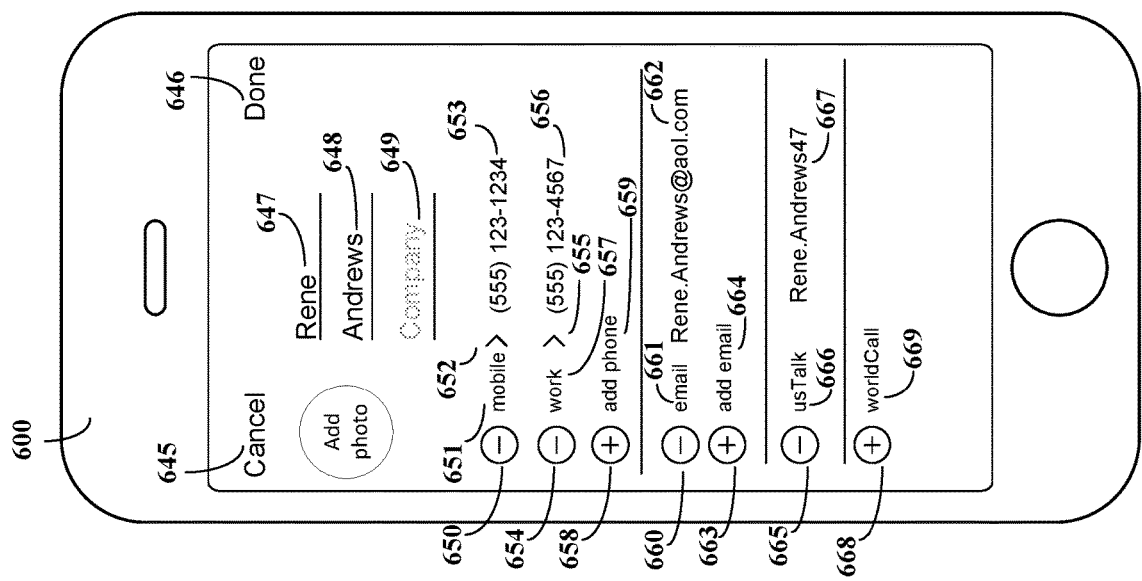

Referring back to FIG. 6B, if user input selecting affordance 616 is received, the editing interface of FIG. 6E optionally is displayed. The editing interface includes affordance 645 for discarding any edits and returning to the contact information interface and affordance 646 for saving any edits and returning to the contact information interface. The editing review interface also includes field 647 for the contacts first name, field 648 for the contact last name, and field 649 for the contact's company. If a field is empty, it optionally has its field name present instead and grayed out, as shown in field 649. The user can select these fields to edit the values within them.

Selection of affordance 653, 656, 662, or 667, representing existing phone numbers, addresses, usernames, allows for editing of the respective units of contact information associated with the affordances. Number labels 651 and 657 indicate the type of phone number. Affordances 652 and 655 allow for changing of the value of the number labels. Labels 661 and 666 identify the type of communication or the application that the associated contact information is associated with. Affordance 650, 654, 660, and 665 allow the user to select contact identification fields to delete. Affordances 658, 663, and 668 allow the user to enter information for additional contact identification fields associated with the communication types or applications in labels 659, 664, and 669.

For example, by selecting affordance 668, the user can enter the username "RRA_Travler" for the worldCall application via an input of the portable electronic device, which results in the display of FIG. 6F. If the user then selects affordance 646 to save the contact information and return to the contact information interface, the contact identification field for the worldCall application will appear, as depicted in FIG. 6G, which is the same as FIG. 6B except the contact identification field with application identification 671, username 672, and affordance 672 has been added.

Figure 6H:
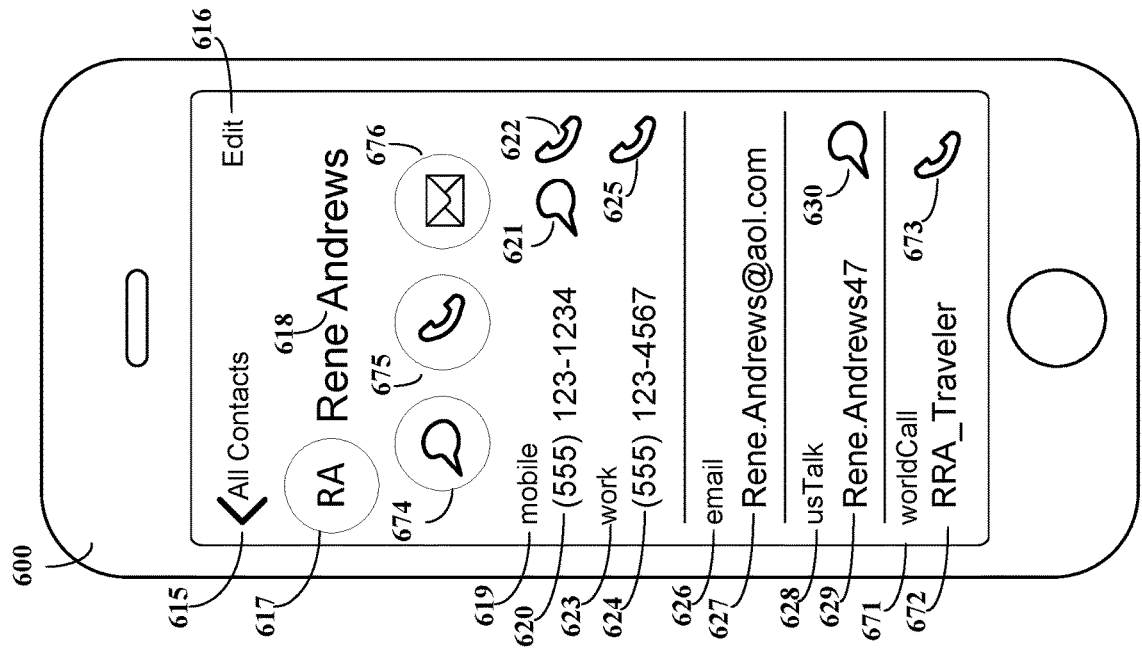
Figure 6G:
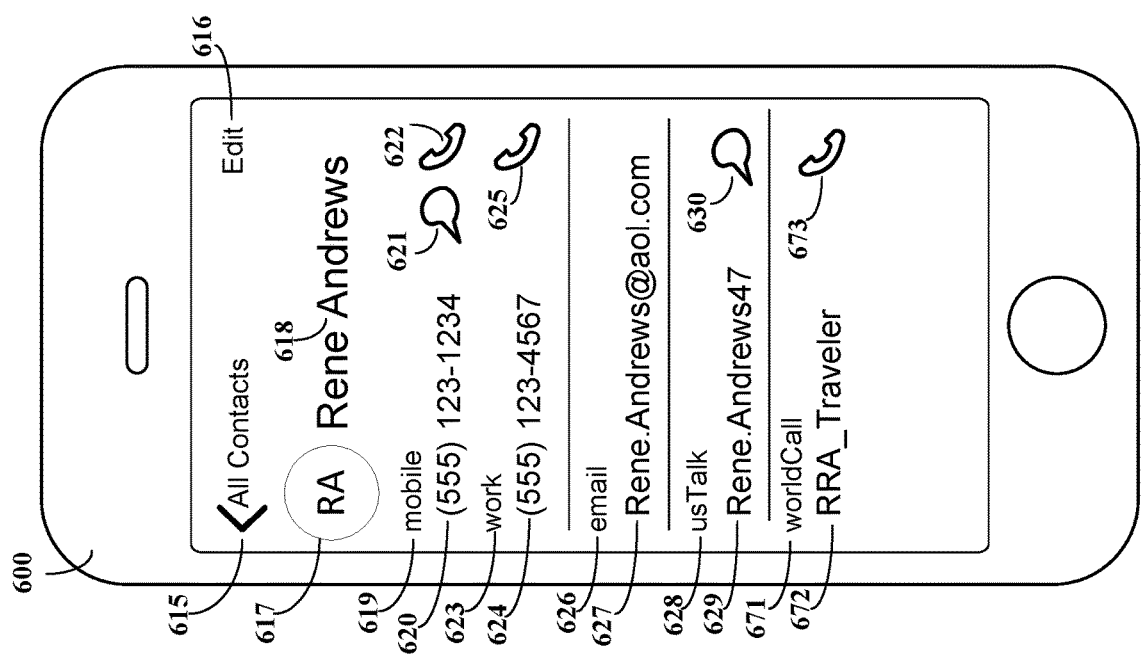

FIG. 6H depicts a contact information interface that is the same as that of FIG. 6B, except FIG. 6H includes affordances 674, 675, and 676 that are separated from the contact identification fields. The affordances are visually separated from the contact information and, optionally, are preferred-communications affordances in that they are not visually related to any particular contact identified field in the contact information interface. These affordances can be used to initiate respective types of communications (e.g., instant message for affordance 674, phone call for affordance 675, and email for affordance 676) with the contact using a determined communication application and associated unit of contact information for the contact. Other affordances for other types of communication (e.g., video communication) could also be included.

In response to receiving user input selecting one of affordances 674, 675, or 676, device 600 initiates the respective type of communication using a communication application for a preferred unit of contact information that is associated with the selected affordance. For example, if Rene.Andrews47 is the preferred unit of contact information for affordance 674, user input selecting affordance 674 will launch usTalk and initiate communication with Rene Andrews using the Rene.Andrews47 username. That is, Rene.Andrews47 is the preferred unit of contact information for messaging applications, even though (555) 123-1234 could also be used for messaging using a different, first-party messaging application.

Various techniques can be used to associate a unit of contact information with one of the preferred communication affordances. For example, in response to receiving user input selecting one of the affordances, optionally a determination is made of whether a unit of contact information has been previously associated with the affordance. If no association exists, optionally an interface is presented that allows the user to select a unit of contact information that supports the type of communication associated with the affordance. For example, if affordance 674 is selected, optionally a user interface be presented that allows a user to select either (555) 123-1234 or Rene.Andrews47 as the preferred unit of contact information for affordance 674. The next time user input is received selecting affordance 674, usTalk will launch and open a conversation or messaging interface for Rene.Andrews47.

In some embodiments, optionally, a unit of contact information is associated with a preferred communication affordance based on past communications. For example, optionally, the associations are automatically made based on the last unit of contact information that was used or based on the unit of contact information that is most often used to communicate with the contact.

In accordance with some embodiments, optionally, a unit of contact information is associated with a preferred communication affordance based on particular types of user input that will result in presentation of an interface for selecting the unit of contact information to associate with the affordance. For example, if a touch user input selecting an affordance is longer than a threshold amount of time, the interface for selecting a unit of contact information to associate with the affordance is presented.

Figure 6I:
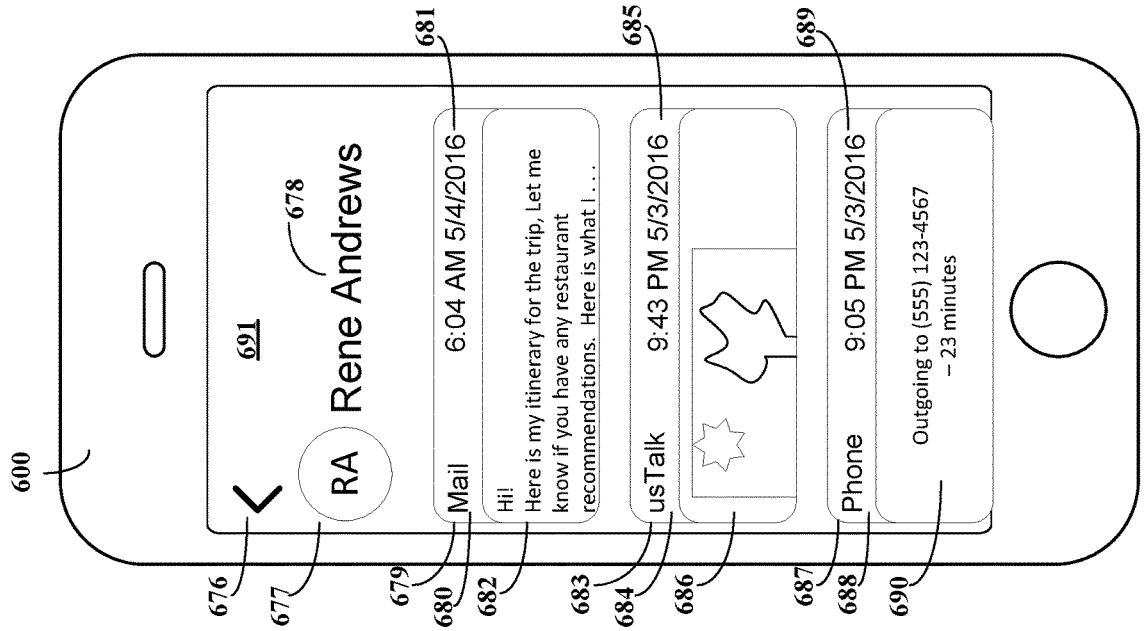

Optionally, in addition to allowing access and editing of contact information, the contact information interfaces described above, such as those of FIGS. 6G and 6H, also allow access to a dashboard summarizing communications with the contact. For example, in response to receiving a swipe user input on the contact information interfaces of FIG. 6G or 6H, dashboard interface 691 of FIG. 6I is displayed.

Dashboard interface 691 includes communication data and other data about the contact, such as recent communications between the user and the first contact, recent information posted by the first contact, or recent information about the first contact. For example, dashboard interface includes summary elements 679, 683, and 687, each associated with a different communication application. Summary element 680 is for the first-party Mail application, as indicated by label 679. Date 681 and communication excerpt 682 are also included. Summary element 684 is for the third-party usTalk application and includes date 685 and image 686 that formed content of the communication. Summary element 688 is for the first-party Phone application and includes date 689 and communication summary 690. Affordance 676 provides for returning to the contact information interface of FIGS. 6G and 6H. Icon 677 and name 678 identify the contact associated with the dashboard.

In response to selecting affordance 622 of FIG. 6G, optionally, a first-party calling application using the built-in cellular calling feature of portable electronic device 600 is opened and communication with Rene Andrews is be commenced using the listed mobile number. This result is depicted in FIG. 7A. First-party calling interface 700 includes affordances 702, 704, 706, for performing various functions. For example, optionally, in response to selection of any of the affordances, portable electronic device takes various actions, such as muting a microphone of portable electronic device 600, opening the keypad interface, turning on the speaker of portable electronic device 600, opening an interface that allows for another contact to be added to the call, sending a request for a video communication to Rene Andrews, or opening the contact information interface for Rene Andrews. In response to selection of affordance 712 electronic device 600 ends the call. Indicator 7710 provides for the duration of the current communication. Indicator 708 identifies the contact that is being called.

In response to selecting affordance 673 of FIG. 6G, electronic device 600 executes a third-party calling application (worldCall) and initiates communication with Rene Andrews using the listed username for the third-party calling application. Even though electronic device 600 initiates communication with contact information for a third-party communication service, the same calling interface 700 is used. This result is depicted in FIG. 7B. Calling interface 700 in FIG. 7B is the same calling interface of FIG. 7A except for indicator 714 that identifies the third-party calling application that is responsible for the call. Optionally, indicator 714 is also graphical (e.g., an icon associated with worldCall).

In some examples, the first-party calling user interface is used for incoming phone calls from third-party applications in a similar manner (e.g., with a displayed label indicating that the third-party application is added to the first-party user interface). In some examples, for incoming phone calls that are identified as potentially being fraudulent or unsolicited (e.g., based on a database of phone numbers from which potentially fraudulent and/or unsolicited phone calls are frequently received), the first-party calling user interface is updated to indicate that the incoming phone call is potentially fraudulent and/or unsolicited, along with an indication of why the phone call is being flagged (e.g., "potential spam, based on phone call spam detection database").

FIG. 8 is a flow diagram illustrating a method for managing contacts with first- and third-party communication applications using an electronic device in accordance with some embodiments. Method 800 is performed at an electronic device (e.g., 100, 300, 500, 600) with a display. Some operations in method 800 are, optionally, combined, the order of some operations is, optionally, changed, and some operations are, optionally, omitted.

As described below, method 800 provides an intuitive way for managing contacts with first- and third-party communication applications. The method reduces the cognitive burden on a user for managing contacts with first- and third-party communication applications, thereby creating a more efficient human-machine interface. For battery-operated computing devices, enabling a user to manage contacts with first- and third-party communication applications faster and more efficiently conserves power and increases the time between battery charges.

The portable electronic device displays (802) a plurality of affordances (e.g., 603-610) associated with a plurality of contacts (e.g., contact listing in FIG. 6A). In some examples the affordances are graphical elements including contact names or other contact information.

The portable electronic device receives (804) first user input selecting a first affordance (e.g., 604) of the plurality of affordances (e.g., 603-610) for a first contact (e.g., Rene Andrews) of the plurality of contacts (e.g., contact listing in FIG. 6A).

In response to the portable electronic device receiving the first user input and in accordance with a determination that a first communication application (e.g., usTalk of FIG. 6B) is in a set of communication applications installed on the portable electronic device (e.g., a set of third-party communications applications), the portable electronic device displays (808) a contact information interface (e.g., interface of FIG. 6B) (e.g., a contact card) for the first contact. The contact information interface includes a first contact identification field (e.g., field displaying elements 628 and 629) for the first contact. The first contact identification field is associated with the first contact (e.g., Rene Andrews) and the first communication application (e.g., usTalk). In some embodiments, this determination-dependent display allows the portable electronic device to display only contact information for communications applications that are installed on the portable electronic device, thus making for a cleaner interface that is faster to navigate and easier to locate desired information and interfaces.

In accordance with some embodiments, prior to the portable electronic device displaying the contact information interface (e.g., interface of FIG. 6B), the portable electronic device determines (806) the set of communication applications (e.g., third-party communications applications) installed on the portable electronic device. In some examples the portable electronic device makes the determination by checking a database of installed applications, an API call, or available contact fields in a contact database.

In accordance with some embodiments, the set of communications applications include one or more messaging applications (e.g., WeChat, WhatsApp, usTalk).

In accordance with some embodiments, the set of communications applications include one or more social networking applications (e.g., Facebook, Twitter).

In accordance with some embodiments, the set of communications applications include one or more voice over IP (VOIP) applications (e.g., Skype, worldCaller).

In accordance with some embodiments, the contact information interface is a first-party application (e.g., contact interface of the Phone application) and includes links to a plurality of first party applications (e.g., 621 (Messages), 622 (Phone)).

In accordance with some embodiments, the portable electronic device receives a second user input selecting a contact interface object (e.g., 622 or 673) for the contact identification field. In response to the portable electronic device receiving the second user input, the portable electronic device initiates a communication (e.g., FIGS. 7A and 7B) via the first communication application using a unit of contact information associated with the first contact identification field (e.g., launching the first communication application and opening a conversation between the user and the first contact for text or image based communication and/or sending a request to the first contact to participate in a live communication such as a voice or video call).

In accordance with some embodiments, a unit of contact information (e.g., 627) (e.g. a username, a phone number, or an address) is associated with the first contact identification field (e.g., field representing 628 and 629) and a second contact identification field (e.g., field for 669 in FIG. 6E) (e.g., a user name or address field for another communication application) for the first contact does not have an associated unit of contact information. The portable electronic device displays the unit of contact information (e.g., 627) for the first contact identification field with the first contact identification field in the contact information interface (e.g., contact card of FIG. 6B). The portable electronic device forgoes display of the second contact identification field based on the absence of a unit for contact information data associated with the second contact identification field (e.g., FIG. 6B, there is no display for the worldCall application).

In accordance with some embodiments, the unit of contact information for the first contact identification field is based on content (e.g., 644) of communications with the first contact (e.g., FIG. 6D).

In accordance with some embodiments, the portable electronic device displays on the contact information interface an indication (e.g., 632) with the contact identification field that the unit of contact information (e.g., 629) (e.g., a flag or other indication that it is an implicit suggestion for contact data) is based on content of communications with the first contact. In response to the portable electronic device receiving a request to remove the indication (e.g., selection of 638), the portable electronic device removes the indication while maintaining the unit of contact information in the contact information interface (e.g., transition from FIG. 6C to FIG. 6D to FIG. 6B).

In accordance with some embodiments, the first contact data (e.g., 620, 624, 627, 629, 672) for the first contact identification field was provided via an input interface of the portable electronic device.

In accordance with some embodiments, the portable electronic device receives a third user input to enter an edit mode for a first contact (e.g. selection of affordance 616). In response to the portable electronic device receiving the third user input, the portable electronic device displays a contact edit interface (e.g., edit interface of FIGS. 6E and 6F) including the second contact identification field (e.g., field associated with 669).

In accordance with some embodiments, the contact information interface (e.g., interface of FIG. 6B) includes a recommendation of a unit of contact information for the first contact identification field received from a third-party communication application of the set of communication applications.

In accordance with some embodiments, the portable electronic device receives external contact data (e.g., a contact file exported from a contact database) from an external electronic device, wherein the external contact data includes a unit of contact information (e.g., a username or address field for another communication application) for the first communication application. The portable electronic device associates the unit of contact information with the first contact identification field.

In accordance with some embodiments, the contact information interface includes (810) [a] a plurality of units of contact information (e.g., 620, 624, 627, 629, 672) (e.g., email address, phone number, social networking user ID) which the portable electronic device uses to communicate with the first contact via one or more types of communication (e.g., email, text message, multimedia message, voice call, video call); and [b] a set of one or more preferred-communication affordances (e.g. 674-676) for the portable electronic device to initiate communication with the first contact via different types of communication that are visually separated from the plurality of units of contact information (e.g., FIG. 6H) (e.g., the set of one or more affordances are not visually identified as being associated with specific units of contact information).

In accordance with some embodiments, the portable electronic device detects (812) selection of a respective preferred-communication affordance of the set of one or more preferred-communication affordances that is associated with a respective type of communication. In response to the portable electronic device detecting selection of the respective preferred-communication affordance (e.g., 675), the portable electronic device initiates (814) the respective type of communication with the first contact via a preferred unit of contact information (e.g., 672) that is associated with the respective preferred-communication affordance (e.g., 675). The set of one or more preferred-communication affordances allows a user to quickly setup a default communication method for several different types of communications, which improves the man-machine interface by providing a more efficient and simpler user interface to initiating communications with a contact.

In accordance with some embodiments, the first contact is associated with a plurality of units of contact information (e.g., 619, 623, 627, 629, 672) that are configured to be used to communicate with the first contact via the respective type of communication (e.g., Facebook Messenger, iMessage, SMS, WeChat can all be used for text communication, and Skype, Cellular Phone Call, and Facetime can all be used for voice communication). The preferred unit of contact information is one of the units of contact information that are configured to be used to communicate with the first contact.

In accordance with some embodiments, the set of one or more preferred-communication affordances includes two or more of: a voice communication affordance (e.g., 675), a text communication affordance (e.g., 674), a video communication affordance, an email communication affordance (e.g., 676).

In accordance with some embodiments, the preferred unit of contact information is a unit of contact information for a third-party application (e.g., 672) (e.g., the quick communication actions are capable of initiating communications using either first-party applications or third-party applications, depending on the preferences of the user).

In accordance with some embodiments, further in response to the selection of the respective preferred-communication affordance (e.g., 675) and in accordance with the portable electronic device determining that preferred contact information has not been selected for the respective preferred-communication affordance, the portable electronic device displays, on the display, representations of a plurality of units of contact information for the first contact that are available for selections as preferred units of contact information for the type of communication represented by the respective preferred-communication affordance (e.g., the portable electronic device displays an interface that presents usernames, phone numbers, and/or address for the user to select from). While the portable electronic device displays the representations of a plurality of units of contact information, the portable electronic device receives fourth user input selecting an available unit of contact information as the preferred contact information for the type of communication represented by the respective preferred-communication affordance. In response to the portable electronic device receiving the fourth user input, the portable electronic device selects the available unit of contact information as the preferred contact information for the type of communication represented by the respective preferred-communication affordance (e.g., the contact information that will be used to initiate a communication when the respective preferred-communication affordance is selected).

In accordance with some embodiments, the portable electronic device determines a preferred unit of contact information (e.g., 672) for the respective preferred-communication affordance (e.g., 675) based on past communications on the portable electronic device with the first contact. In some examples, the determination is made on the most recently or frequently used application for the type of communication for the preferred-communication affordance. This allows the portable electronic device to assign a communication service to a preferred-communication affordance based on the user's existing communications habits, thus improving the man-machine interface by making it easier for the user to initiate communications with a contact using the communications applications that the user uses most often.

In accordance with some embodiments, the portable electronic device receives fifth user input (e.g., a long touch) selecting an affordance of the set of one or more preferred-communication affordances. In response to the portable electronic device receiving the fifth user input, the portable electronic device determines whether a duration of the fifth user input exceeds a threshold (e.g., 1 second, 2 seconds). In accordance with the portable electronic device determining that the duration exceeds the threshold, the portable electronic device enters a contact information selection interface to select an available unit of contact information as the preferred contact information for the type of communication represented by the selected affordance.

In accordance with some embodiments, the portable electronic device initiating the respective type of communication with the first user via a preferred unit of contact information that is associated with the respective affordance includes: [a] in accordance with the portable electronic device determining that the respective preferred-communication affordance is associated with a unit of contact information that is associated with a first-party application (e.g., the Phone application), the portable electronic device initiates the respective type of communication with the first-party application (FIG. 7A); and [b] in accordance with the portable electronic device determining that the respective preferred-communication affordance (e.g., 675) is associated with a unit of contact information (e.g., 672) that is associated with a third-party application (e.g., worldCall), the portable electronic device initiates the respective type of communication with the third-party application (e.g., FIG. 7B).

In accordance with some embodiments, the respective type of communication is a voice call. The portable electronic device initiates the respective type of communication with the first-party application (e.g., a voice call using the built-in cellular calling feature of a mobile phone) includes displaying a first-party calling user interface (e.g., a user interface that has an "end call" button, a duration timer, and caller information identifying the contact being called). The portable electronic device initiates the respective type of communication with the third-party application (e.g., a VoIP app such as Skype) includes the portable electronic device displaying the first-party calling user interface (e.g., FIG. 7B) (e.g., the user interface that has the "end call" button, the duration timer, and caller information identifying the contact being called displayed at the same size and location as for the voice call using the first-party application) with a displayed label (e.g., 710) (e.g., a text label such as "Skype Call" or a graphical label such as an icon for the Skype app) indicating the name of the third-party application that is being used to initiate the communication. In some examples, the first-party calling user interface is used for incoming phone calls from third-party applications in a similar manner (e.g., with a displayed label indicating the third-party application is added to the first-party user interface). In some examples, for incoming phone calls that are identified as potentially being fraudulent or unsolicited (e.g., based on a database of phone numbers from which potentially fraudulent and/or unsolicited phone calls are frequently received), the first-party calling user interface is updated to indicate that the incoming phone call is potentially fraudulent and/or unsolicited, along with an indication of why the phone call is being flagged (e.g., "potential spam, based on phone call spam detection database").

In accordance with some embodiments, while the portable electronic device displays the contact information interface, the portable electronic device receives user input corresponding to a swipe gesture. In response to the portable electronic device receiving the user input corresponding to the swipe gesture, the portable electronic device replaces display of the contact information interface (e.g., field displaying elements 628 and 629) with display of a dashboard interface (e.g., 691) for the first contact FIG. 6I. The dashboard interface includes aggregated information associated (e.g., 679, 683, 687) with the first contact (e.g., recent communications between the user and the first contact, recent information posted by the first contact, recent information about the first contact) that has been retrieved from a plurality of applications (e.g., 690, 684, 688) on the device.

In accordance with some embodiments, the aggregated information is divided into a plurality of regions that are associated with different applications (e.g., FIG. 6I).

In accordance with some embodiments, the plurality of applications include one or more first-party applications (e.g., a mail application, a messages application, a phone application, a location sharing application), and one or more third-party applications (e.g., a social networking application, messing application) (e.g., FIG. 6I).

Figure 9:
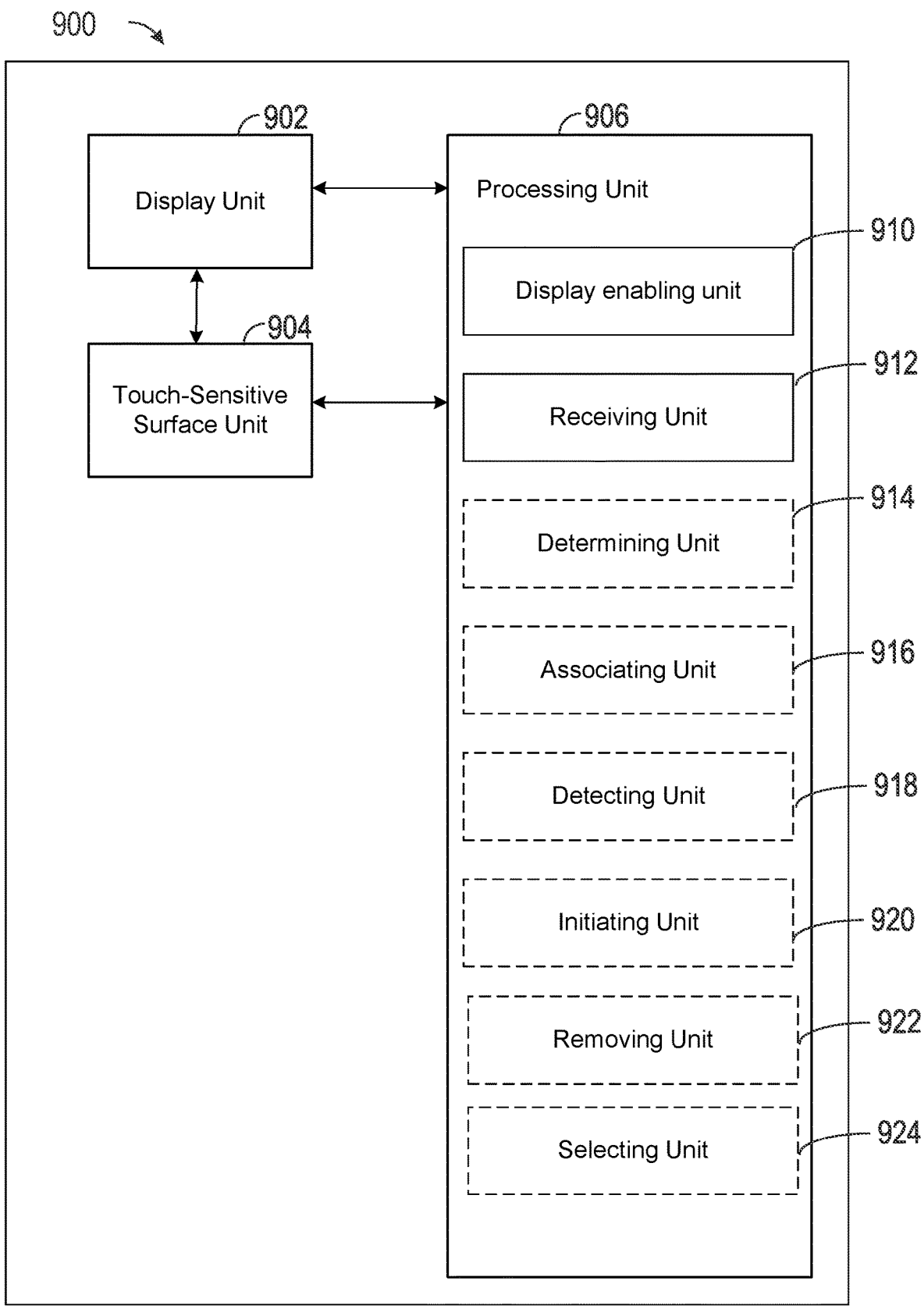
FIG. 9 is a functional block diagram, in accordance with some embodiments.

The operations described above with reference to FIG. 8 are, optionally, implemented by components depicted in FIGS. 1A-1B or FIG. 9. For example, block 804 optionally is implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

In accordance with some embodiments, FIG. 9 shows an exemplary functional block diagram of an electronic device 900 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 9 are, optionally, combined or separated into sub-blocks to implement the principles of the various described examples. Therefore, the description herein optionally supports any possible combination or separation or further definition of the functional blocks described herein.

As shown in FIG. 9, an electronic device 900 includes a display unit 902 configured to display a graphic user interface, optionally, a touch-sensitive surface unit 904 configured to receive contacts, and a processing unit 906 coupled to the display unit 902 and, optionally, the touch-sensitive surface unit 904. In some embodiments, the processing unit 906 includes a displaying enabling unit 910 and a receiving unit 912, and, optionally, a determining unit 914, an associating unit 916, a detecting unit 918, an initiating unit 920, a removing unit 922, and a selecting unit 924.

The processing unit 906 is configured to enable display (e.g., with display enabling unit 910) of a plurality of affordances associated with a plurality of contacts; receive (e.g., with receiving unit 912) first user input selecting a first affordance of the plurality of affordances for a first contact of the plurality of contacts; and in response to receiving the first user input and in accordance with a determination that a first communication application is in a set of communication applications installed on the portable electronic device, enable display (e.g., with display enabling unit 910) of a contact information interface for the first contact, wherein the contact information interface includes a first contact identification field for the first contact, and wherein the first contact identification field is associated with the first contact and the first communication application.

In some embodiments, the processing unit is further configured to, prior to displaying the contact information interface, determine (e.g., with determining unit 914) the set of communication applications installed on the portable electronic device.

In some embodiments, the contact information interface is a first party application and includes links to a plurality of first party applications.

In some embodiments, the processing unit is further configured to receive (e.g., with receiving unit 912) a second user input selecting a contact interface object for the contact identification field; and, in response to receiving the second user input, initiate (e.g., using initiating unit 920) a communication via the first communication application using a unit of contact information associated with the first contact identification field.

In some embodiments, a unit of contact information is associated with the first contact identification field and a second contact identification field for the first contact does not have an associated unit of contact information. The processing unit 910 is further configured to enable display (e.g., with display enabling unit 910) of the unit of contact information for the first contact identification field with the first contact identification field in the contact information interface; and forgot display (e.g., with display enabling unit 910) of the second contact identification field based on the absence of a unit for contact information data associated with the second contact identification field.

In some embodiments, the unit of contact information for the first contact identification field is based on content of communications with the first contact.

In some embodiments, the processing unit is further configured to enable display (e.g., with display enabling unit 910) of on the contact information interface an indication with the contact identification field that the unit of contact information is based on content of communications with the first contact; and in response to receiving a request to remove the indication, remove (e.g., with removing unit 922) the indication while maintaining the unit of contact information in the contact information interface.

In some embodiments, the first contact data for the first contact identification field was provided via an input interface of the portable electronic device.

In some embodiments, the processing unit is further configured to receive (e.g., with receiving unit 912) a third user input to enter an edit mode for a first contact; and in response to receiving the third user input, enable display (e.g., with display enabling unit 910) of a contact edit interface including the second contact identification field.

In some embodiments, the contact information interface includes a recommendation of a unit of contact information for the first contact identification field received from a third-party communication application of the set of communication applications.

In some embodiments, the processing unit 906 is further configured to receive (e.g., with receiving unit 912) external contact data from an external electronic device, wherein the external contact data includes a unit of contact information for the first communication application; and associate (e.g., with associating unit 916) the unit of contact information with the first contact identification field.

In some embodiments, the contact information interface includes: a plurality of units of contact information which can be used to communicate with the first contact via one or more types of communication; and a set of one or more preferred-communication affordances for initiating communication with the first contact via different types of communication that are visually separated from the plurality of units of contact information. The processing unit 906 is further configured to: detect (e.g., with detecting unit 918) selection of a respective preferred-communication affordance of the set of one or more preferred-communication affordances that is associated with a respective type of communication; and in response to detecting selection of the respective preferred-communication affordance, initiate (e.g., with initiating unit 920) the respective type of communication with the first user via a preferred unit of contact information that is associated with the respective preferred-communication affordance.

In some embodiments, the first contact is associated with a plurality of units of contact information that are configured to be used to communicate with the first contact via the respective type of communication, and the preferred unit of contact information is one of the units of contact information that are configured to be used to communicate with the first contact.

In some embodiments, the set of one or more preferred-communication affordances includes two or more of: a voice communication affordance, a text communication affordance, a video communication affordance, an email communication affordance.

In some embodiments, the preferred unit of contact information is a unit of contact information for a third-party application.

In some embodiments, the processing unit 906 is further configured to: further in response to the selection of the respective preferred-communication affordance and in accordance with a determination that preferred contact information has not been selected for the respective preferred-communication affordance, enable display (e.g., with display enabling unit 910) of, on the display representations of a plurality of units of contact information for the first contact that are available to be selected as preferred contact information for the type of communication represented by the respective preferred-communication affordance; while displaying the representations of a plurality units of contact information, receive (e.g., with receiving unit 912) fourth user input selecting an available unit of contact information as the preferred contact information for the type of communication represented by the respective preferred-communication affordance; and in response to receiving the fourth user input, select (e.g., with selecting unit 924) the available unit of contact information as the preferred contact information for the type of communication represented by the respective preferred-communication affordance.

In some embodiments, determining a preferred unit of contact information for the respective preferred-communication affordance is based on past communications on the portable electronic device with the first contact.

In some embodiments, the processing unit 906 is further configured to: receive (e.g., with receiving unit 912) fifth user input selecting an affordance of the set of one or more preferred-communication affordances; in response to receiving the fifth user input, determine (e.g., with determining unit 914) whether a duration of the fifth user input exceeds a threshold; and in accordance with a determination that the duration exceeds the threshold, enabling display (e.g., with display enabling unit 910) a contact information selection interface to select an available unit of contact information as the preferred contact information for the type of communication represented by the selected affordance.

In some embodiments, the processing unit 906 is further configured to initiate (e.g., with initiating unit 920) the respective type of communication with the first user via a preferred unit of contact information that is associated with the respective affordance includes: the processing unit 906 being further configured to, in accordance with a determination that the respective preferred-communication affordance is associated with a unit of contact information that is associated with a first-party application, initiate (e.g., with initiating unit 920) the respective type of communication with the first-party application; and in accordance with a determination that the respective preferred-communication affordance is associated with a unit of contact information that is associated with a third-party application, initiate (e.g., with initiating unit 920) the respective type of communication with the third-party application.

In some embodiments, the respective type of communication is a voice call and the processing unit 906 is further configured to initiate (e.g., with initiating unit 920) the respective type of communication with the first-party application includes displaying a first-party calling user interface; and initiate (e.g., with initiating unit 920) the respective type of communication with the third-party application includes displaying the first-party calling user interface with a displayed label indicating the name of the third-party application that is being used to initiate the communication.

In some embodiments, the processing unit 906 is further configured to, while displaying the contact information interface, receive (e.g., with receiving unit 912) user input corresponding to a swipe gesture; and in response to receiving the user input corresponding to the swipe gesture, enable replacement of the display (e.g. with display enabling unit 910) display of the contact information interface with display of a dashboard interface for the first contact, wherein the dashboard interface includes aggregated information associated with the first contact that has been retrieved from a plurality of applications on the device.

In some embodiments, the aggregated information is divided into a plurality of regions that are associated with different applications.

In some embodiments, the plurality of applications includes one or more first-party applications, and one or more third-party applications.

In some embodiments, the set of communications applications include one or more messaging applications.

In some embodiments, the set of communications applications include one or more social networking applications.

In some embodiments, the set of communications applications include one or more voice over IP (VOIP) applications.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device comprising:
a display;
one or more processors;
a memory; and
one or more programs, wherein the one or more programs are stored in memory and configured to be executed by the one or more processors, the one or more programs including instructions for:
displaying a plurality of affordances associated with a plurality of contacts;
detecting an input selecting a first affordance of the plurality of affordances for a first contact of the plurality of contacts;
in response to detecting the input selecting the first affordance and in accordance with a determination that a first-party communication application and a third-party communication application different from the first-party communication application are installed on the electronic device, displaying a contact information interface, wherein the contact information interface includes:
a second affordance configured to communicate with the first contact using the first-party communication application, and
a third affordance configured to communicate with the first contact using the third-party communication application;
while displaying the contact information interface, detecting an input to initiate a communication session with the first contact;
in response to detecting the input to initiate the communication session with the first contact:
in accordance with a determination that the input to initiate the communication session with the first contact corresponds to the second affordance:
displaying a first-party calling user interface; and
initiating a communication session with the first contact using the first-party communication application; and
in accordance with a determination that the input to initiate the communication session with the first contact corresponds to selecting the third affordance:
displaying the first-party calling user interface; and
initiating the communication session with the first contact using the third-party communication application.

2. The electronic device of claim 1, wherein initiating the communication session with the first contact using the third-party communication application includes displaying a label in the first-party calling user interface indicating a name of the third-party communication application used to initiate the communication session.

3. The electronic device of claim 1, wherein initiating the communication session with the first contact using a respective communication application includes:
sending a request to the first contact to accept the communication session;
displaying a representation of the request to the first contact in the first-party calling user interface;
accepting the communication session; and
the one or more programs further including instructions for:
detecting an acceptance of the request to the first contact to accept the communication session; and
in response to detecting an acceptance of the request to the first contact to accept the communication session:
ceasing to display the representation of the request to the first contact in the first-party calling user interface; and
displaying an indicator in the first-party calling user interface that provides a duration of the communication session.

4. The electronic device of claim 1, wherein displaying the first-party calling user interface includes displaying an affordance configured to send a request for a video communication.

5. The electronic device of claim 1, wherein displaying the first-party calling user interface includes an affordance, that when activated, initiates displaying an interface for including a second contact in the communication session with the first contact.

6. The electronic device of claim 1, the one or more programs further including instructions for:
in response to detecting an incoming communication session request:
in accordance with a determination that the incoming communication session request is from the first-party communication application, displaying the first-party calling user interface; and
in accordance with a determination that the incoming communication session request is from the third-party communication application, displaying the first-party calling user interface.

7. The electronic device of claim 6, wherein displaying the first-party calling user interface in accordance with the determination that the incoming communication session request is from the third-party communication application, displaying a label indicating a name of the third-party communication application requesting the communication session.

8. A non-transitory computer-readable storage medium storing one or more programs configured to be executed by one or more processors of an electronic device with a display and a touch sensitive surface, the one or more programs including instructions for:
displaying a plurality of affordances associated with a plurality of contacts;
detecting an input selecting a first affordance of the plurality of affordances for a first contact of the plurality of contacts;
in response to detecting the input selecting the first affordance and in accordance with a determination that a first-party communication application and a third-party communication application different from the first-party communication application are installed on the electronic device, displaying a contact information interface, wherein the contact information interface includes:
a second affordance configured to communicate with the first contact using the first-party communication application, and
a third affordance configured to communicate with the first contact using the third-party communication application;
while displaying the contact information interface, detecting an input to initiate a communication session with the first contact;
in response to detecting the input to initiate the communication session with the first contact:
in accordance with a determination that the input to initiate the communication session with the first contact corresponds to the second affordance:
displaying a first-party calling user interface; and
initiating a communication session with the first contact using the first-party communication application; and
in accordance with a determination that the input to initiate the communication session with the first contact corresponds to selecting the third affordance:
displaying the first-party calling user interface; and
initiating the communication session with the first contact using the third-party communication application.

9. The non-transitory computer-readable storage medium of claim 8, wherein initiating the communication session with the first contact using the third-party communication application includes displaying a label in the first-party calling user interface indicating a name of the third-party communication application used to initiate the call.

10. The non-transitory computer-readable storage medium of claim 8, wherein initiating the communication session with the first contact using a respective communication application includes:
sending a request to the first contact to accept the communication session;
displaying a representation of the request to the first contact in the first-party calling user interface;
accepting the communication session; and
the one or more programs further including instructions for:
detecting an acceptance of the request to the first contact to accept the communication session; and
in response to detecting an acceptance of the request to the first contact to accept the communication session:
ceasing to display the representation of the request to the first contact in the first-party calling user interface; and
displaying an indicator in the first-party calling user interface that provides a duration of the communication session.

11. The non-transitory computer-readable storage medium of claim 8, wherein displaying the first-party calling user interface includes displaying an affordance configured to send a request for a video communication.

12. The non-transitory computer-readable storage medium of claim 8, wherein displaying the first-party calling user interface includes an affordance, that when activated, initiates displaying an interface for including a second contact in the communication session with the first contact.

13. The non-transitory computer-readable storage medium of claim 8, the one or more programs further including instructions for:
in response to detecting an incoming communication session request:
in accordance with a determination that the incoming communication session request is from the first-party communication application, displaying the first-party calling user interface; and
in accordance with a determination that the incoming communication session request is from the third-party communication application, displaying the first-party calling user interface.

14. The non-transitory computer-readable storage medium of claim 13, wherein displaying the first-party calling user interface in accordance with the determination that the incoming communication session request is from the third-party communication application, displaying a label indicating a name of the third-party communication application requesting the communication session.

15. A method, comprising:
at an electronic device having a display:
displaying a plurality of affordances associated with a plurality of contacts;
detecting an input selecting a first affordance of the plurality of affordances for a first contact of the plurality of contacts;

in response to detecting the input selecting the first affordance and in accordance with a determination that a first-party communication application and a third-party communication application different from the first-party communication application are installed on the electronic device, displaying a contact information interface, wherein the contact information interface includes:
- a second affordance configured to communicate with the first contact using the first-party communication application, and
- a third affordance configured to communicate with the first contact using the third-party communication application;

while displaying the contact information interface, detecting an input to initiate a communication session with the first contact;

in response to detecting the input to initiate the communication session with the first contact:
- in accordance with a determination that the input to initiate the communication session with the first contact corresponds to the second affordance:
  - displaying a first-party calling user interface; and
  - initiating a communication session with the first contact using the first-party communication application; and
- in accordance with a determination that the input to initiate the communication session with the first contact corresponds to selecting the third affordance:
  - displaying the first-party calling user interface; and
  - initiating the communication session with the first contact using the third-party communication application.

16. The method of claim 15, wherein initiating the communication session with the first contact using the third-party communication application includes displaying a label in the first-party calling user interface indicating a name of the third-party communication application used to initiate the communication session.

17. The method of claim 15, wherein initiating the communication session with the first contact using a respective communication application includes:
sending a request to the first contact to accept the communication session;
displaying a representation of the request to the first contact in the first-party calling user interface;
accepting the communication session; and
the method further comprising:
- detecting an acceptance of the request to the first contact to accept the communication session; and
- in response to detecting an acceptance of the request to the first contact to accept the communication session:
  - ceasing to display the representation of the request to the first contact in the first-party calling user interface; and
  - displaying an indicator in the first-party calling user interface that provides a duration of the communication session.

18. The method of claim 15, wherein displaying the first-party calling user interface includes displaying an affordance configured to send a request for a video communication.

19. The method of claim 15, wherein displaying the first-party calling user interface includes an affordance, that when activated, initiates displaying an interface for including a second contact in the communication session with the first contact.

20. The method of claim 15, further comprising:
in response to detecting an incoming communication session request:
- in accordance with a determination that the incoming communication session request is from the first-party communication application, displaying the first-party calling user interface; and
- in accordance with a determination that the incoming communication session request is from the third-party communication application, displaying the first-party calling user interface.

21. The method of claim 20, wherein displaying the first-party calling user interface in accordance with the determination that the incoming communication session request is from the third-party communication application, displaying a label indicating a name of the third-party communication application requesting the communication session.

* * * * *